(12) United States Patent
Xie et al.

(10) Patent No.: US 11,750,417 B2
(45) Date of Patent: Sep. 5, 2023

(54) METHOD FOR ESTABLISHING COMMUNICATION CONNECTION

(71) Applicant: TENCENT TECHNOLOGY (SHENZHEN) COMPANY LIMITED, Shenzhen (CN)

(72) Inventors: Lei Xie, Shenzhen (CN); Guangwen Wu, Shenzhen (CN); Daibin Xie, Shenzhen (CN); Yale Zhang, Shenzhen (CN)

(73) Assignee: Tencent Technology (Shenzhen) Company Limited, Guangdong (CN)

(*) Notice: Subject to any disclaimer, the term of this patent is extended or adjusted under 35 U.S.C. 154(b) by 0 days.

(21) Appl. No.: 17/149,139

(22) Filed: Jan. 14, 2021

(65) Prior Publication Data

US 2021/0135901 A1 May 6, 2021

Related U.S. Application Data

(63) Continuation of application No. PCT/CN2020/113035, filed on Sep. 2, 2020.

(30) Foreign Application Priority Data

Sep. 19, 2019 (CN) .......................... 201910888666.8

(51) Int. Cl.
*G06F 15/173* (2006.01)
*H04L 12/46* (2006.01)

(52) U.S. Cl.
CPC .................................. *H04L 12/46* (2013.01)

(58) Field of Classification Search
CPC ......... H04L 12/46; H04L 9/3239; H04L 9/50; H04L 12/4625; H04L 63/0807;
(Continued)

(56) References Cited

U.S. PATENT DOCUMENTS 11,295,359 B1 * 4/2022 Mullins .............. G06Q 10/0837
2008/0137611 A1 * 6/2008 Miao ...................... H04W 36/10
370/331
(Continued)

FOREIGN PATENT DOCUMENTS

CN 106254238 A 12/2016
CN 108306819 A 7/2018
(Continued)

OTHER PUBLICATIONS

Author: Hu, WO2018095075-A1—English Translation, Publication Date: May 31, 2018 (Year: 2018).*
(Continued)

*Primary Examiner* — Nicholas P Celani
*Assistant Examiner* — Karina J Garcia-Ching
(74) *Attorney, Agent, or Firm* — Crowell & Moring, L.L.P.

(57) ABSTRACT

Embodiments disclosed include a method for establishing a communication connection. The method includes: receiving a connection request message transmitted by a first terminal, the connection request message carrying a first user identifier and a second user identifier; determining a second relay node corresponding to the second user identifier, the second relay node being a relay node communicatively connected to a second terminal; transmitting the connection request message to the second relay node through a relay path to the second relay node, so that the second relay node transmits the connection request message to the second terminal; and transmitting, in response to receiving a connection confirmation message returned by the second terminal, the connection confirmation message to the first terminal, so that the first terminal establishes a communication connection with the second terminal based on the connection confirmation message.

16 Claims, 10 Drawing Sheets

(58) Field of Classification Search
CPC . H04L 63/0876; H04L 67/141; H04L 67/145; H04L 67/562
USPC .......................................................... 709/238
See application file for complete search history.

(56) References Cited

U.S. PATENT DOCUMENTS

| | | | | |
|---|---|---|---|---|
| 2015/0117293 | A1* | 4/2015 | Cho ..................... | H04W 76/40 370/312 |
| 2015/0372879 | A1* | 12/2015 | Mori ..................... | H04L 63/107 709/203 |
| 2015/0382275 | A1* | 12/2015 | Pragada .............. | H04W 28/021 370/252 |
| 2017/0280381 | A1 | 9/2017 | Hoffmann et al. | |
| 2019/0158605 | A1 | 5/2019 | Markuze et al. | |
| 2020/0275258 | A1* | 8/2020 | Huang .................. | H04W 76/11 |

FOREIGN PATENT DOCUMENTS

| | | | | |
|---|---|---|---|---|
| CN | 108667717 | A | 10/2018 | |
| CN | 109492380 | A | 3/2019 | |
| CN | 109714751 | A | 5/2019 | |
| CN | 109996306 | A | 7/2019 | |
| CN | 110445882 | A | 11/2019 | |
| JP | 2007-135044 | | 5/2007 | |
| JP | 2008-205988 | | 9/2008 | |
| JP | 2009-246522 | | 10/2009 | |
| WO | WO-2018095075 | A1 * | 5/2018 | ............ H04L 45/24 |
| WO | WO 2018/212756 | A1 | 11/2018 | |
| WO | WO 2019/039811 | A1 | 2/2019 | |

OTHER PUBLICATIONS

International Search Report issued in International Application No. PCT/CN2020/113035.
Office Action issued on Japanese application JP 2021-513803 dated Jun. 4, 2022, 6 pages.
Translation of Japanese Office Action 2021-513803.
Extended European Search Report of European Application 20833709.7, dated Sep. 27, 2022, 9 pages.
Korean Office Action dated Dec. 15, 2022 in corresponding Korean Patent Application No. 10-2021-7011880 with English translation.

* cited by examiner

METHOD FOR ESTABLISHING COMMUNICATION CONNECTION

RELATED APPLICATION

This application is a continuation application of PCT Patent Application No. PCT/CN2020/113035, filed on Sep. 2, 2020, which claims priority to Chinese Patent Application No. 201910888666.8, entitled "COMMUNICATION CONNECTION METHOD AND APPARATUS, COMPUTER DEVICE, AND STORAGE MEDIUM" and filed with the National Intellectual Property Administration, PRC on Sep. 19, 2019, wherein the content of each of the above-referenced applications is incorporated herein by reference in its entirety.

FIELD OF THE TECHNOLOGY

This application relates to the field of computer technologies, and in particular, to a communication connection method and apparatus, a computer device, and a storage medium.

BACKGROUND OF THE DISCLOSURE

With the rapid development of the computer network, communication technologies become indispensable in daily life. To meet requirements of communicating diversified data, for example, sharing videos, sharing pictures, and sharing texts, an end-to-end communication technology is developed accordingly.

As shown in FIG. 1, an end-to-end communication technology is provided. A first terminal 101 obtains an Internet protocol (IP) address and a port number of a second terminal 102, and transmits a connection request message to the second terminal 102 according to the IP address of the second terminal 102, the connection request message including the port number of the second terminal 102. After receiving the connection request message, the second terminal 102 establishes a communication connection with the first terminal 101 through a port corresponding to the port number.

If the location of the second terminal 102 changes, a local area network on which the second terminal 102 is located may also change, resulting in a change of the IP address of the second terminal 102. In this case, the communication connection between the first terminal 101 and the second terminal 102 is interrupted, and the communication connection needs to be re-established between the first terminal 101 and the second terminal 102, resulting in relatively low communication efficiency.

SUMMARY

Embodiments of this disclosure provide a communication connection method and apparatus, a computer device, and a storage medium, which can improve the communication efficiency. The technical solutions are as follows:

According to one aspect, a communication connection method performed by a first relay node is provided. The method may include receiving a connection request message transmitted by a first terminal. The connection request message may carry a first user identifier for logging into the first terminal and a second user identifier for logging into a second terminal. The method may further include determining a second relay node corresponding to the second user identifier. The second relay node may be a relay node communicatively connected to the second terminal. The method may include transmitting the connection request message to the second relay node through a relay path to the second relay node, so that the second relay node transmits the connection request message to the second terminal. The method may further include transmitting, upon reception of a connection confirmation message returned by the second terminal, the connection confirmation message to the first terminal, so that the first terminal establishes a communication connection with the second terminal based on the connection confirmation message.

According to another aspect, a communication connection method performed by a control node is provided. The method may include receiving a path request transmitted by a first relay node. The path request may be transmitted by the first relay node upon reception of a connection request message transmitted by a first terminal. The connection request message may carry a first user identifier for logging into the first terminal and a second user identifier for logging into a second terminal, and the path request may carry identification information of the first relay node and the second user identifier. The method may include determining a second relay node corresponding to the second user identifier. The second relay node may be a relay node communicatively connected to the second terminal. The method may transmit, based on the identification information, information about a relay path between the first relay node and the second relay node to the first relay node, so that the first relay node transmits the connection request message to the second relay node according to the information about the relay path, and the second relay node transmits the connection request message to the second terminal.

According to another aspect, a communication connection method performed by a third relay node is provided. The method may include receiving a connection request message transmitted by a previous-hop relay node. The connection request message may be transmitted by a first terminal to the previous-hop relay node, and the connection request message may carry a first user identifier for logging into the first terminal and a second user identifier for logging into a second terminal. The method may determine a second relay node corresponding to the second user identifier. The second relay node may be a relay node communicatively connected to the second terminal. The method may select a target relay node from a plurality of next-hop relay nodes of the third relay node. The method may transmit the connection request message to the target relay node, so that the target relay node transmits the connection request message to the second relay node through a relay path to the second relay node, and the second relay node transmits the connection request message to the second terminal. The method may include transmitting, upon reception of a connection confirmation message returned by the second terminal, the connection confirmation message to the previous-hop relay node, so that the previous-hop relay node transmits the connection confirmation message to the first terminal, and the first terminal establishes a communication connection with the second terminal based on the connection confirmation message.

The technical solutions provided in the embodiments of this disclosure have at least the following beneficial effects:

In the method and apparatus for establishing a communication connection, the computer device, and the storage medium provided in the embodiments of this disclosure, both the first terminal and the second terminal log in to relay nodes, and a communication connection between the first terminal and the second terminal is established by using at least one relay node. Because the first terminal and the second terminal log in to the relay nodes, changes of address information of the first terminal and the second terminal do not affect communication between the first terminal as well as the second terminal and the relay nodes to which the first terminal and the second terminal log in, and address information of the relay nodes do not change, the communication connection is not affected. When a location of the first terminal or the second terminal changes, the first terminal and the second terminal can still communicate with each other by using the established communication connection. There is no need to re-establish a connection, so that the communication efficiency is improved.

BRIEF DESCRIPTION OF THE DRAWINGS

To describe the technical solutions in the embodiments of this disclosure more clearly, the following briefly describes the accompanying drawings required for describing the embodiments. Apparently, the accompanying drawings in the following description show only some embodiments of this disclosure, and a person of ordinary skill in the art may still derive other accompanying drawings according to the accompanying drawings without creative efforts.

DESCRIPTION OF EMBODIMENTS

To make the objectives, technical solutions, and advantages of this disclosure clearer, the following further describes implementations of this disclosure in detail with reference to the accompanying drawings.

It may be understood that the terms "first", "second", and the like used in this disclosure may be used for describing various concepts in this specification. However, the concepts are not limited by the terms unless otherwise specified. The terms are merely used for distinguishing one concept from another concept. For example, without departing from the scope of this disclosure, a first terminal may be referred to as a second terminal, and similarly, the second terminal may be referred to as the first terminal.

For the terms "at least one", "a plurality of", "each", and "any" used in this disclosure, "at least one" includes one, two, or more, "a plurality of" includes two or more, "each" refers to each of "a plurality of corresponding ones", and "any" refers to any one of "a plurality of ones". For example, a plurality of relay nodes include three relay nodes, "each" refers to each of the three relay node, and "any" refers to any one of the three relay nodes, which may be the first one, the second one, or the third one.

Figure 1:
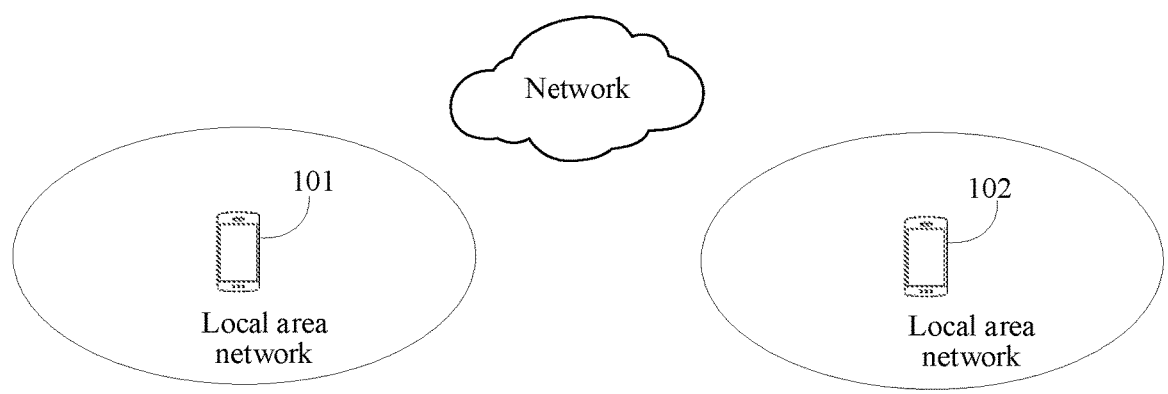
FIG. 1 is a schematic diagram of establishing a communication connection according to the related art.
Figure 2:
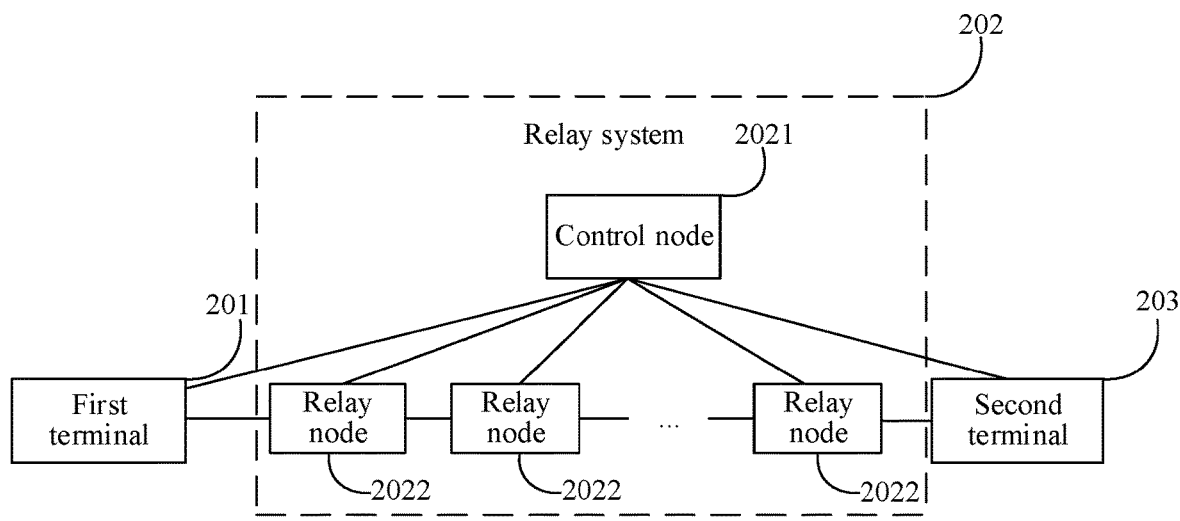
FIG. 2 is a schematic diagram of an implementation environment according to an embodiment of this disclosure.

FIG. 2 is a schematic diagram of an implementation environment according to an embodiment of this disclosure. Referring to FIG. 2, the implementation environment includes: a first terminal 201, a relay system 202, and a second terminal 203. The first terminal 201 and the second terminal 203 are each communicatively connected to the relay system 202 through a network.

The first terminal 201 and the second terminal 203 are devices such as mobile phones, computers, or tablet computers. The relay system 202 is a server, a server cluster including a plurality of servers, or a cloud computing service center. This is not limited in the embodiments of this disclosure.

When the first terminal 201 communicates with the second terminal 203, the first terminal 201 transmits communication data to the relay system 202, and the relay system 202 forwards the communication data to the second terminal 203. Alternatively, the second terminal 203 transmits communication data to the relay system 202, and the relay system 202 forwards the communication data to the first terminal 201.

The relay system 202 includes a control node 2021 and a plurality of relay nodes 2022. The control node 2021 is configured to manage the terminals and the plurality of relay nodes, and the plurality of relay nodes 2022 are configured to forward communication data between the first terminal 201 and the second terminal 203. Optionally, the plurality of relay nodes 2022 are located in different regions, and cross-region communication can be implemented through data relay by using the plurality of relay nodes 2022.

In a possible implementation, a target application is installed on the terminal 201, the relay system is associated with the target application, and the relay system provides services to the target application. The target application has a communication function, and the first terminal 201 communicates with the second terminal 203 by using the target application.

Figure 3:
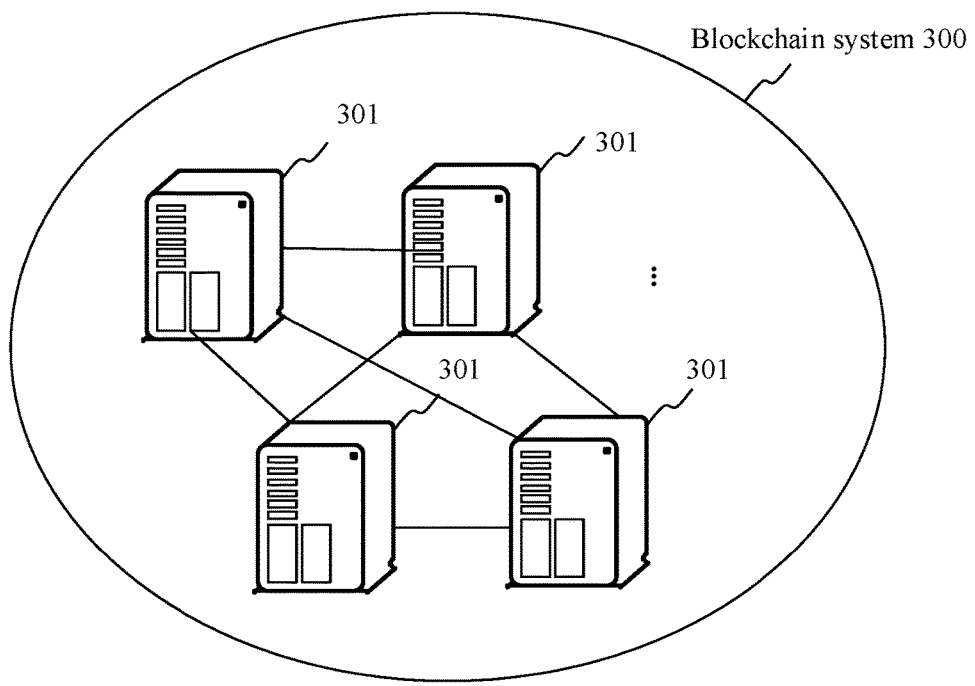
FIG. 3 is a schematic diagram of a blockchain system according to an embodiment of this disclosure.

Optionally, as shown in FIG. 3, a blockchain system is further provided.

Referring to the blockchain system shown in FIG. 3, the blockchain system 300 is a system for data sharing between nodes, and the blockchain system includes a plurality of nodes 301. Each node 301 can receive input information and maintain shared data in the blockchain system based on the received input information during normal working. To ensure information exchange in the blockchain system, there is an information connection between each two nodes in the blockchain system, and the nodes can transmit information to each other through the information connection. For example, when any node in the blockchain system receives input information, other nodes in the blockchain system obtain the input information according to a consensus algorithm, and store the input information as data in the shared data, so that data stored in all the nodes in the blockchain system is consistent.

Each node in the blockchain system has a corresponding node identifier, and each node in the blockchain system can store node identifiers of other nodes in the blockchain system, to broadcast a generated block to the other nodes in the blockchain system based on the node identifiers of the other nodes subsequently. Each node may maintain a node identifier list shown in the following table, and correspondingly store a node name and a node identifier in the node identifier list. The node identifier may be an IP address or any other information that can be used to identify the node. Only an IP address is used for description in Table 1.

TABLE 1

| Node name | Node identifier |
|---|---|
| Node 1 | 117.114.151.174 |
| Node 2 | 117.116.189.145 |
| ... | ... |
| Node N | 119.123.789.258 |

Figure 4:
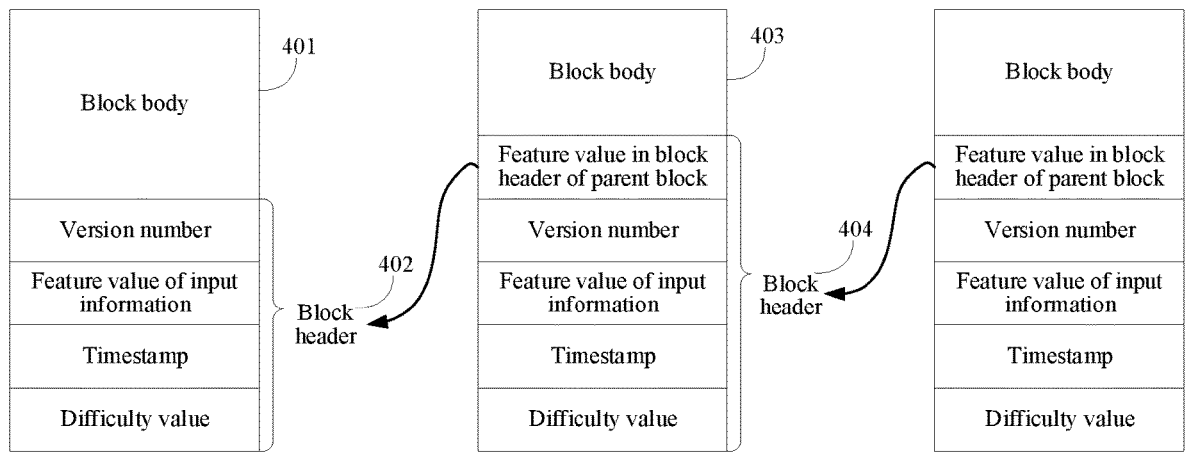
FIG. 4 is a schematic diagram of a blockchain according to an embodiment of this disclosure.

Each node in the blockchain system stores the same blockchain. Referring to FIG. 4, the blockchain includes a plurality of blocks, and a genesis block includes a block header 402 and a block body 401. The block header 402 stores a feature value of input information, a version number, a timestamp, and a difficulty value, and the block body 401 stores the input information. A next block of the genesis block uses the genesis block as a parent block, and the next block also includes a block header 404 and a block body 403. The block header 404 stores a feature value of input information of the current block, the feature value in the block header 402 of the parent block, a version number, a timestamp, and a difficulty value, and the rest is deduced by analogy, so that block data stored in each block in the blockchain is associated with block data stored in the parent block, ensuring the security of the input information in the blocks.

In this embodiment of this disclosure, any one of the control node and the plurality of relay nodes may be a node in the blockchain, and can share obtained information with other nodes in the blockchain system, implementing information sharing among a plurality of nodes.

Figure 5:
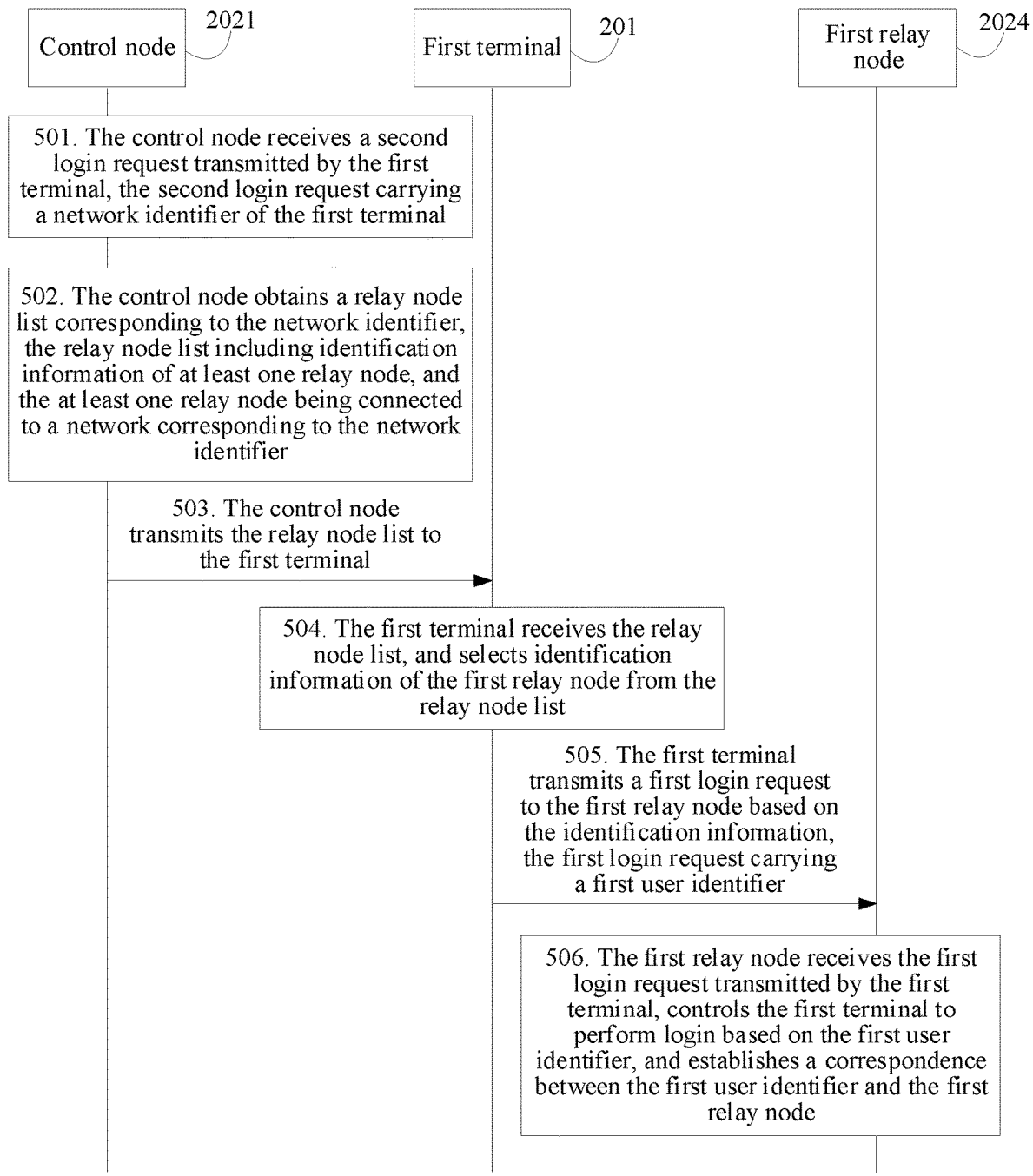
FIG. 5 is a flowchart of a login method according to an embodiment of this disclosure.

FIG. 5 is a flowchart of a login method according to an embodiment of this disclosure. In this embodiment, interaction is performed by the first terminal 201 and the relay system 202 shown in FIG. 2, and a login process is described in this embodiment of this disclosure. Referring to FIG. 5, the method includes the following steps:

501. The control node 2021 receives a second login request transmitted by the first terminal 201, the second login request carrying a network identifier of the first terminal 201.

The control node 2021 is a server in the relay system 202 that is configured to manage a plurality of relay nodes and a plurality of terminals. Optionally, the control node 2021 stores related information of the plurality of relay nodes and the plurality of terminals. In a possible implementation, the control node 2021 may store status information of the plurality of relay nodes and configuration information of the plurality of terminals.

Optionally, the status information of the relay node includes at least one of the following: a node identifier of the relay node, address information of the relay node, a network to which the relay node is communicatively connected, a relay process list corresponding to the relay node, and address information corresponding to each relay process. This is not limited in this embodiment of this disclosure. The configuration information of the terminal includes an interaction manner of the terminal. For example, the terminal transmits a heartbeat packet to the control node at an interval of a preset duration, to notify the control node of status information of the terminal.

Optionally, the first terminal 201 transmits the second login request in the following case: If the first terminal 201 starts the target application, the first terminal 201 transmits the second login request to the control node 2021, the control node 2021 being a server associated with the target application.

After starting the target application, the first terminal 201 may perform Internet service provider (ISP) identification, to obtain the network identifier of the first terminal 201, and transmit the second login request to the control node 2021, the second login request carrying the network identifier of the first terminal 201. The network identifier may indicate a network service provider corresponding to a network. Optionally, the network identifier is a number corresponding to the network service provider, the name of the company to which the network service provider belongs, or the like. Due to different network service providers, the terminal may be communicatively connected to different networks. For example, if the terminal is communicatively connected to a network provided by a network service provider A, a network identifier is an identifier A. If the terminal is communicatively connected to a network provided by a network service provider B, a network identifier is an identifier B.

Alternatively, the network identifier can further indicate a connection range of the network to which the terminal is communicatively connected. For example, the network to which the terminal is communicatively connected is a local network, a regional network, a national network, or a global network. For example, when the terminal is communicatively connected to the local network, the network identifier is 1. When the terminal is communicatively connected to the regional network, the network identifier is 2. When the terminal is communicatively connected to the national network, the network identifier is 3. When the terminal is communicatively connected to the global network, the network identifier is 4.

In a possible implementation, the second login request further includes a location of the first terminal 201. Optionally, the location is obtained through positioning by using a positioning system on the first terminal 201, or obtained through positioning by using a global positioning system (GPS).

A network connection is established between the control node 2021 and the first terminal 201, and services are provided for the first terminal 201 through the network connection. After receiving the second login request transmitted by the first terminal 201, the control node 2021 may allocate a relay node for the first terminal 201 according to the second login request and the status information of the plurality of relay nodes, so that the first terminal logs into the allocated relay node.

502. The control node 2021 obtains a relay node list corresponding to the network identifier, the relay node list including identification information of at least one relay node, and the at least one relay node being communicatively connected to a network corresponding to the network identifier.

A plurality of relay nodes may be communicatively connected to networks provided by different network service providers. For example, a first relay node is communicatively connected to the network provided by the network service provider A, and a second relay node is communicatively connected to the network provided by the network service provider B. This is not limited in this embodiment of this disclosure.

The second login request carries the network identifier of the first terminal 201, so that the control node 2021 can obtain, according to the network identifier carried in the second login request, at least one relay node communicatively connected to a network corresponding to the network identifier. The control node filters out a relay node that is communicatively connected to another network.

The obtaining a relay node and the filtering out a relay node refer to: obtaining identification information of the relay node and filtering out identification information of the relay node. In a possible implementation, the control node 2021 obtains identification information of a plurality of relay nodes, and screens the identification information of the plurality of relay nodes according to the network identifier of the first terminal, to obtain identification information of at least one relay node, the at least one relay node being communicatively connected to the network corresponding to the network identifier. The identification information of the relay node is a unique identifier of the relay node. Optionally, the identification information is an internal IP address of the relay node, an external IP address of the relay node, a serial number of the node, a name of the node, or the like. The identification information is not limited in this embodiment of this disclosure.

For example, if the network identifier of the first terminal is the identifier A, identification information of a relay node that is communicatively connected to the network provided by the network service provider A is obtained, and identification information of a relay node that is communicatively connected to the network provided by the network service provider B and identification information of a relay node that is connected to a network provided by the network service provider C are filtered out.

In a possible implementation, the network identifier can further indicate a network connection range of the first terminal, and at least one relay node that meets the network connection range of the first terminal is selected from the obtained at least one relay node. For example, the network identifier is 1, indicating that the terminal is communicatively connected to the local network, and if the terminal is located in Shenzhen, at least one relay node located in Shenzhen is obtained. Alternatively, the network identifier is 2, indicating that the terminal is communicatively connected to the regional network, and if the terminal is located in Shenzhen, at least one relay node located in the Guangdong province is obtained.

In another possible implementation, the second login request further carries the location of the first terminal, and the control node 2021 can perform further screening on the selected at least one relay node according to the location. For example, if the first terminal 201 is located in Shenzhen, the control node 2021 may select a relay node that is close to the first terminal 201, such as a relay node located in Shenzhen or a relay node located in Guangzhou, and filter out a relay node located in Shanghai and a relay node located in Tianjin.

After screening the identification information of the plurality of relay nodes, the control node 2021 adds the obtained identification information of the at least one relay node into the relay node list.

503. The control node 2021 transmits the relay node list to the first terminal.

504. The first terminal 201 receives the relay node list, and selects identification information of a first relay node 2024 from the relay node list.

The first relay node 2024 is any one of the plurality of relay nodes. The relay node list includes identification information of at least one relay node. If the relay node list includes identification information of one relay node, the relay node corresponding to the identification information is directly determined as the first relay node. If the relay node list includes identification information of a plurality of relay nodes, the first terminal 201 selects one relay node from the plurality of relay nodes as the first relay node 2024.

In a possible implementation, if the relay node list includes identification information of a plurality of relay nodes, the first terminal 201 randomly selects one piece of identification information from the relay node list, and uses a relay node corresponding to the identification information as the first relay node 2024. In another possible implementation, the first terminal 201 may select, according to a target condition, a relay node that meets the target condition from the plurality of relay nodes as the first relay node 2024. For example, the target condition is a speed condition, and the speed condition is that a data transmission speed of the first relay node 2024 is greater than a data transmission speed of another relay node. In another example, the target condition is a load condition, and the load condition is that a load amount of the first relay node 2024 is less than a load amount of another relay node.

After receiving the relay node list, the first terminal 201 can perform, according to the identification information in the relay node list, speed detection on the relay nodes corresponding to the identification information, and use a relay node having the highest data transmission speed in the plurality of relay nodes as the first relay node 2024. Optionally, the speed detection performed on the relay node by the first terminal 201 includes: transmitting first data to the relay node, obtaining a first time at which the first data is transmitted, receiving the first data forwarded by the relay node, obtaining a second time at which the first data is received, and determining, according to a time difference between the first time and the second time, a data transmission speed between the first terminal 201 and the relay node.

In a possible implementation, after a data transmission speed of each relay node is obtained, a target quantity of relay nodes are selected, and one of the target quantity of relay nodes is used as the first relay node 2024, and another one of the target quantity of relay nodes is used as a standby relay node. When a fault occurs in the first relay node, the first terminal can perform login by using the standby relay node. Data transmission speeds of the target quantity of relay nodes are greater than a data transmission speed of another relay node in the plurality of relay nodes.

Optionally, the using, by the first terminal 201, one of the target quantity of relay nodes as the first relay node 2024 includes: randomly selecting one relay node from the target quantity of relay nodes as the first relay node 2024; or selecting a relay node having the highest data transmission speed in the target quantity of relay nodes as the first relay node 2024, or selecting a relay node having the smallest load amount from the target quantity of relay nodes as the first relay node 2024.

The target quantity may be two, three, four, five, or any quantity. The target quantity is not limited in this embodiment of this disclosure.

505. The first terminal 201 transmits a first login request to the first relay node 2024 based on the identification information, the first login request carrying a first user identifier.

The first user identifier is a user identifier logging into the first terminal 201, and the first user identifier is used for indicating an identity of a user of the first terminal 201. In a possible implementation, the target application is installed on the first terminal 201, and the first user identifier is a user account that is used for logging into the target application.

In a possible implementation, the first login request further carries an internal IP address of the first terminal 201, so that the first relay node 2024 may subsequently communicate with the first terminal 201 based on the internal IP address.

506. The first relay node 2024 receives the first login request transmitted by the first terminal 201, controls the first terminal 201 to perform login based on the first user identifier, and establishes a correspondence between the first user identifier and the first relay node 2024.

After receiving the first login request, the first relay node 2024 can obtain the first user identifier carried in the first login request. Optionally, the establishing, by the first relay node 2024, a correspondence between the first user identifier and the first relay node 2024 includes: correspondingly storing, by the first relay node 2024, the first user identifier and the identification information of the first relay node 2024 into the control node 2021, so that the control node 2021 selects, based on the stored first user identifier and the stored identification information of the first relay node 2024, a corresponding relay node to establish a communication connection between the first terminal 201 and a second terminal.

For example, the first relay node 2024 transmits a registration request to the control node 2021, the registration request carrying the first user identifier and the identification information of the first relay node 2024, and the control node 2021 receives the registration request, and correspondingly stores the first user identifier and the identification information of the first relay node 2024.

In a possible implementation, the first login request carries address information of the first terminal 201, such as an internal IP address. Optionally, the establishing, by the first relay node 2024, a correspondence between the first user identifier and the first relay node 2024 refers to: establishing a correspondence between the first user identifier, the identification information of the first relay node 2024, and the address information of the first terminal 201.

In a possible implementation, the first relay node 2024 transmits a registration request to the control node 2021, the registration request carrying the first user identifier, the identification information of the first relay node 2024, and the address information of the first terminal 201. The control node 2021 receives the registration request, and correspondingly stores the first user identifier, the identification information of the first relay node 2024, and the address information of the first terminal 201. Optionally, the address information of the first terminal 201 includes: an internal IP address of the first terminal 201, or an internal IP address and an external IP address of the first terminal 201. When receiving the first login request, the first relay node 2024 can obtain the address information of the first terminal 201.

Optionally, the identification information of the first relay node 2024 includes a node name of the first relay node 2024 and address information of the first relay node 2024. Optionally, the address information of the first relay node 2024 includes at least one of an external IP address and an internal IP address of the first relay node 2024. The control node 2021 establishes a communication connection with the first relay node 2024 according to the address information of the first relay node 2024, to implement data transmission with the first relay node 2024.

In addition, after the login succeeds, the control node 2021 can further transmit the external IP address of the first terminal 201 to the first terminal 201. Therefore, the first terminal 201 learns the external IP address of the first terminal 201. When the first terminal 201 communicates with another terminal, the external IP address can be carried, so that the first relay node 2024 forwards, based on the external IP address, communication data that is transmitted by the another terminal to the first terminal 201.

This embodiment of this disclosure is described only by using an example in which the first terminal 201 logs into the relay system. In another embodiment, the second terminal 203 can also log into the relay system, and a process of logging into the relay system by the second terminal 203 is similar to the process of logging into the relay system by the first terminal 201. Details are not described herein.

In the method provided in this embodiment of this disclosure, the relay system 202 includes a plurality of relay nodes, and the first terminal 201 logs into the first relay node 2024. Subsequently, a communication connection between the first terminal 201 and the second terminal 203 can be established by using the first relay node 2024 and another relay node in the relay system 202, and communication may be performed through the communication connection. Because the communication connection is established between the first terminal 201 and the second terminal 203 by logging into relay nodes, a location change of the first terminal 201 or the second terminal 203 does not affect connections between the first terminal 201 as well as the second terminal 203 and the relay nodes to which the first terminal 201 and the second terminal 203 log in, and address information of the relay nodes do not change, the communication connection between the first terminal 201 and the second terminal 203 is not affected, and the first terminal 201 and the second terminal 203 can still communicate with each other by using the established communication connection. There is no need to re-establish a connection, so that the communication efficiency is improved.

In addition, when selecting the first relay node 2024, considering a network to which a relay node is communicatively connected and a data transmission speed of the relay node, the first terminal 201 selects a first relay node 2024 having a higher data transmission speed. The first relay node 2024 to which the first terminal 201 logs in may transmit data faster, which ensures a data transmission speed, thereby ensuring the real-time communication between the first terminal 201 and the second terminal 203.

Figure 6:
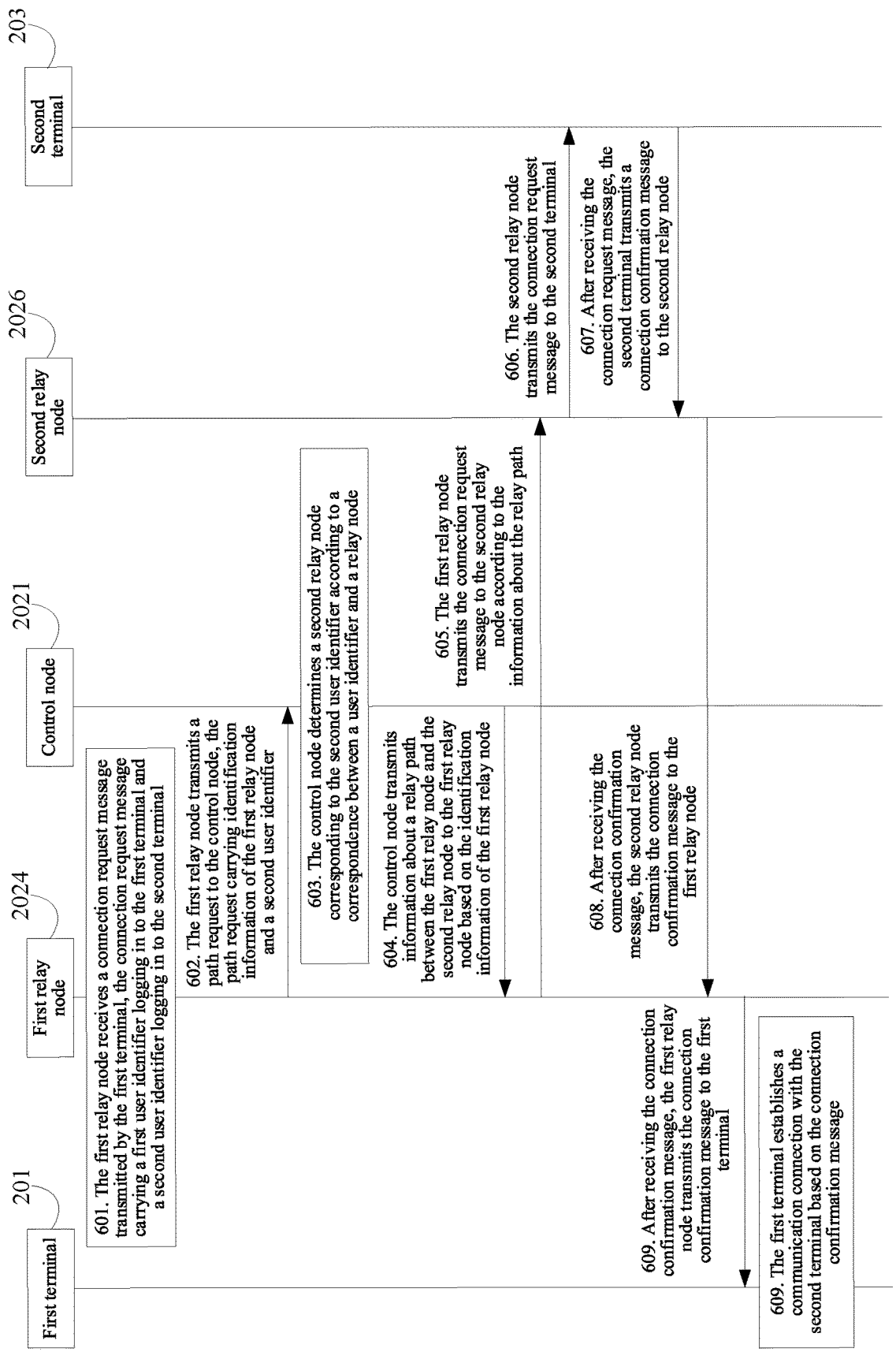
FIG. 6 is a flowchart of a method for establishing a communication connection according to an embodiment of this disclosure.
Figure 7:
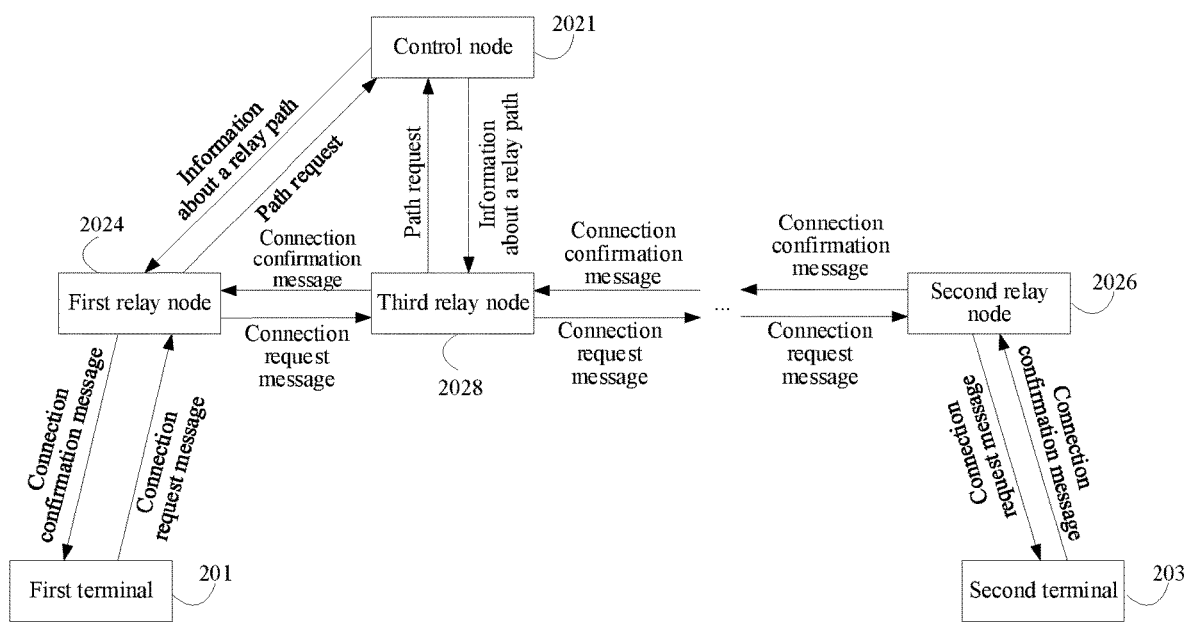
FIG. 7 is a diagram of data exchange for establishing a communication connection according to an embodiment of this disclosure.

FIG. 6 is a flowchart of a method for establishing a communication connection according to an embodiment of this disclosure. FIG. 7 is a diagram of data exchange for establishing a communication connection according to an embodiment of this disclosure. In this embodiment of this disclosure, interaction is performed by the first terminal 201, the relay system 202, and the second terminal 203 shown in FIG. 2, and a process of establishing a communication connection is described in this embodiment of this disclosure. Referring to FIG. 6 and FIG. 7, the method includes the following steps:

601. A first relay node 2024 receives a connection request message transmitted by the first terminal 201, the connection request message carrying a first user identifier logging into the first terminal 201 and a second user identifier logging into the second terminal 203.

The connection request message is transmitted to the first relay node 2024 by the first terminal 201 upon reception of an instruction for communicating with the second terminal 203 after the first terminal 201 logs into the first relay node 2024. For example, a user inputs communication data in a chat interface of the first terminal 201, the chat interface being an interface for chatting between the first terminal 201 and the second terminal 203. If the first terminal 201 receives a transmission instruction triggered by the user, the first terminal 201 transmits a connection request message to the first relay node 2024. Optionally, the communication data is text data, audio data, video data, or the like.

The user identifier is used for identifying an identity of the user of the terminal. Optionally, the user identifier is a user account, a nickname of the user, a phone number of the user, or the like.

In a possible implementation, the first terminal 201 may establish connections with different second terminals by using different internal IP addresses. Therefore, when the first terminal 201 establishes a communication connection with a second terminal 203, the first terminal may add, to a connection request message, an internal IP address that is used to establish the communication connection with the second terminal 203. Optionally, when the first terminal 201 logs in to the first relay node 2024, the first relay node 2024 transmits an external IP address of the first terminal 201 to the first terminal 201. Therefore, the first terminal 201 may further add the external IP address to the connection request message.

In a possible implementation, for security, some networks are set as follows: an internal IP address of a terminal changes dynamically. If the first terminal 201 is communicatively connected to such a network, an internal IP address of the first terminal 201 constantly changes, and the first terminal 201 adds a current internal IP address to the connection request message. Optionally, the first terminal 201 further adds the external IP address to the connection request message.

Subsequently, after receiving a connection confirmation message of the second terminal 203, the first relay node 2024 can transmit the connection confirmation message to the first terminal 201 according to the address information of the first terminal 201.

In a possible implementation, the connection request message further includes a token identifier, the token identifier being used for identifying the connection request message. Different connection request messages correspond to different token identifiers. Optionally, the token identifier is in a form of a serial number or a character string. A specific form of the token identifier is not limited in this embodiment of this disclosure.

In a possible implementation, after receiving the connection request message transmitted by the first terminal 201, the first relay node 2024 creates a new process, and use the process to perform the following communication connection steps of the first relay node 2024 in response to the connection request message. In addition, a process identifier of the process is added to a relay process list of the first relay node 2024. The process identifier is address information of the process, such as a port number.

602. The first relay node 2024 transmits a path request to the control node 2021, the path request carrying identification information of the first relay node 2024 and the second user identifier.

After receiving the connection request message, the first relay node 2024 transmits the path request to the control node 2021.

In a possible implementation, the first relay node 2024 transmits the path request to the control node 2021, the path request carrying the identification information of the first relay node 2024 and the second user identifier. After receiving the path request, the control node 2021 performs step 603 and step 604.

In another possible implementation, the path request includes a first path request and a second path request. The first path request carries the second user identifier, and the second path request carries the identification information of the first relay node 2024. The control node 2021 includes an online service module and a control module 2021. The first relay node 2024 transmits the first path request to the online service module, and after receiving the first path request, the online service module performs step 603. After determining a second relay node 2026, the online service module transmits identification information of the second relay node 2026 to the first relay node 2024.

After receiving the identification information of the second relay node 2026, the first relay node 2024 adds the identification information of the second relay node 2024 to the second path request, and transmits the second path request to the control module 2021. After receiving the second path request, the control module 2021 performs step 604.

603. The control node 2021 determines a second relay node 2026 corresponding to the second user identifier according to a correspondence between a user identifier and a relay node.

The second relay node 2026 is a relay node to which the second terminal 203 logs in, and the second relay node 2026 is any relay node in the relay system 202. The second terminal 203 can log in to the second relay node 2026 by using the user identifier logging in to the second terminal 203. When the second terminal 203 logs in to the second relay node 2026, the control node 2021 stores a correspondence between the second user identifier and the second relay node 2026. Therefore, the control node 2021 can query the correspondence between a user identifier and a relay node according to the second user identifier, to obtain the identification information of the second relay node 2026 corresponding to the second user identifier, to determine the second relay node 2026 corresponding to the second user identifier.

In a possible implementation, the control node 2021 can further determine address information of the second terminal 203 according to the second user identifier, and adds the address information of the second terminal 203 to the connection request message. Subsequently, the second relay node 2026 may directly transmit the connection request message to the second terminal 203 based on the address information of the second terminal 203 in the connection request message.

604. The control node 2021 transmits information about a relay path between the first relay node 2024 and the second relay node 2026 to the first relay node 2024 based on the identification information of the first relay node 2024.

The control node 2021 determines the information about the relay path between the first relay node 2024 and the second relay node 2026 based on the identification information of the first relay node 2024 and the identification information of the second relay node 2026. Optionally, when determining the information about the relay path between the first relay node 2024 and the second relay node 2026, the control node 2021 determines a target relay node step by step; or directly determines at least one another relay node through which the first relay node 2024 transmits data to the second relay node 2026.

In a first possible implementation, the control node 2021 determines a target relay node step by step. That the control node 2021 determines a target relay node step by step refers to that the control node 2021 determines only a target relay node of a current relay node. For example, the first relay node 2024 obtains identification information of a target relay node in the control node 2021, and transmits the connection request message to the target relay node. The target relay node obtains identification information of a target relay node of the current relay node in the control node 2021, and transmits the connection request message to the target relay node until obtained identification information of a target relay node is the identification information of the second relay node 2026. The target relay node is a node receiving the connection request message forwarded by the current relay node.

When the control node 2021 determines a next-hop relay node of the first relay node 2024 based on the identification information of the first relay node 2024, there may be the following three cases.

First, the first relay node 2024 and the second relay node 2026 are the same relay node.

After obtaining the identification information of the second relay node 2026, if the identification information of the second relay node 2026 is the same as the identification information of the first relay node 2024, the control node 2021 determines that the second relay node 2026 and the first relay node 2024 are the same relay node. The first relay node 2024 directly transmits the connection request message to the second terminal 203.

Second, the first relay node 2024 is directly communicatively connected to the second relay node 2026.

After obtaining the identification information of the second relay node 2026, the control node 2021 determines that the first relay node 2024 is communicatively connected to the second relay node 2026 based on the identification information of the first relay node 2024 and the identification information of the second relay node 2026, uses the second relay node 2026 as a target relay node of the first relay node 2024, and transmits a node identifier of the second relay node 2026 to the first relay node 2024. The first relay node 2024 transmits the connection request message to the second relay node 2026 according to the node identifier of the second relay node 2026.

Third, the first relay node 2024 and the second relay node 2026 are not the same relay node, and the first relay node 2024 is not directly communicatively connected to the second relay node 2026.

After obtaining the identification information of the second relay node 2026, the control node 2021 determines, based on the identification information of the first relay node 2024 and the identification information of the second relay node 2026, that the first relay node 2024 and the second relay node 2026 are not the same relay node, and the first relay node 2024 is not directly communicatively connected to the second relay node 2026, that is, the second relay node 2026 is not a next-hop relay node of the first relay node 2024. In a possible implementation, a manner in which the control node 2021 determines the information about the relay path between the first relay node 2024 and the second relay node 2026 based on the identification information includes: selecting, by the control node 2021, a target relay node from a plurality of next-hop relay nodes of the first relay node 2024, and transmitting identification information of the target relay node to the first relay node 2024, the identification information including a node identifier of the target relay node.

The selecting a target relay node from a plurality of next-hop relay nodes of the first relay node 2024 may include at least one of the following operations:

(1) Select a target relay node meeting a speed condition from the plurality of next-hop relay nodes of the first relay node 2024, the speed condition being that a data transmission speed between the first relay node 2024 and the target relay node is greater than a data transmission speed between the first relay node 2024 and another next-hop relay node.

In a possible implementation, the control node 2021 stores identification information of an abnormal relay node. The first relay node 2024 transmits identification information of the plurality of next-hop relay nodes of the first relay node 2024 to the control node. The control node 2021 screens the identification information of the next-hop relay nodes according to the stored identification information of the abnormal relay node, and transmits identification information of a next-hop relay node that works normally to the first relay node 2024. The first relay node 2024 performs speed detection on the next-hop relay node that works normally, and transmits a speed detection result to the control node 2021. The control node 2021 selects, according to the speed detection result, a target relay node meeting a speed condition from the plurality of next-hop relay nodes of the first relay node 2024.

In another possible implementation, the control node 2021 stores a topological structure of relay nodes. After the first relay node transmits the identification information of the first relay node 2024 to the control node 2021, the control node 2021 determines, according to the topological structure, a plurality of next-hop relay nodes communicatively connected to the first relay node 2024. Therefore, the first relay node 2024 does not need to transmit identification information of the plurality of next-hop relay nodes to the control node 2021.

A speed detection process is similar to that in step 504. Details are not described herein.

In another possible implementation, the first relay node 2024 transmits identification information of the plurality of next-hop relay nodes of the first relay node to the control node 2021. The control node 2021 screens the identification information of the next-hop relay nodes according to stored identification information of an abnormal relay node, and performs speed detection on a next-hop relay node that works normally. The control node 2021 selects, according to a speed detection result, a target relay node meeting a speed condition from the plurality of next-hop relay nodes of the first relay node 2024.

A next-hop relay node having the highest data transmission speed is selected from the plurality of next-hop relay nodes of the first relay node 2024 as the target relay node, ensuring the data transmission speed between the first relay node 2024 and the second relay node 2026, so that the first terminal 201 interacts with the second terminal 203 in real time.

(2) Select a target relay node meeting a load condition from the plurality of next-hop relay nodes of the first relay node 2024, the load condition being that a load amount of the target relay node is less than a load amount of another next-hop relay node.

A relay node having the smallest load amount is selected from the plurality of next-hop relay nodes of the first relay node 2024. In this way, the proper utilization of a plurality of relay nodes is ensured, and an abnormal relay node or a decrease in a data transmission speed of a relay node caused by a large load amount of the relay node can be avoided.

A load amount of a relay node may be determined by using a relay process list of the relay node. A larger quantity of relay processes in the relay process list indicates a larger load amount of the relay node. In addition, the load amount of the relay node can be determined by using a quantity of terminals logging in to the relay node. This is not limited in this embodiment of this disclosure.

In a possible implementation, the control node 2021 stores relay process lists of all relay nodes. The first relay node 2024 transmits identification information of the plurality of next-hop relay nodes of the first relay node to the control node 2021. The control node 2021 obtains a relay process list of each relay node, and transmits the relay process list of each relay node to the first relay node 2024. The first relay node 2024 selects a target relay node meeting a load condition from the plurality of next-hop relay nodes, the load condition being that a quantity of processes in a relay process list of the target relay node is less than a quantity of processes in a relay process list of another next-hop relay node.

In another possible implementation, the control node 2024 stores relay process lists of all relay nodes. The first relay node 2024 may transmit identification information of the plurality of next-hop relay nodes of the first relay node 2024 to the control node 2021. The control node 2021 obtains a relay process list of each relay node, and selects a target relay node meeting a load condition from the plurality of next-hop relay nodes, the load condition being that a quantity of processes in a relay process list of the target relay node is less than a quantity of processes in a relay process list of another next-hop relay node. After the control node 2021 determines the target relay node, the control node 2021 transmits a node identifier of the target relay node to the first relay node 2024. The first relay node 2024 uses identification information of the target relay node as identification information of a third relay node 2028, and transmits the connection request message to the third relay node 2028.

In a possible implementation, the selecting a target relay node from a plurality of next-hop relay nodes of the first relay node 2024 includes: selecting a target relay node meeting a speed condition and a load condition from the plurality of next-hop relay nodes of the first relay node 2024. In this way, both a data transmission speed and a load amount of the relay node are considered, so that the selected target relay node has better performance.

Optionally, the selecting a target relay node meeting a speed condition and a load condition from the plurality of next-hop relay nodes of the first relay node 2024 includes: determining a first parameter of each next-hop relay node according to a data transmission speed between each next-hop relay node and the first relay node 2024; determining a second parameter of each next-hop relay node according to a load amount of each next-hop relay node; and selecting a target relay node from the plurality of next-hop relay nodes according to the first parameter and the second parameter of each next-hop relay node.

Optionally, the first parameter has a positive correlation with the data transmission speed, and the second parameter has a negative correlation with the load amount. The selecting a target relay node from the plurality of next-hop relay nodes according to the first parameter and the second parameter of each next-hop relay node includes: performing statistical processing on the first parameter and the second parameter of each next-hop relay node, to obtain a third parameter of each next-hop relay node, the third parameter being capable of indicating performance of the relay node; and selecting a next-hop relay node having the largest third parameter as the target relay node.

The speed and the load may affect performance differently. Optionally, the performing statistical processing on the first parameter and the second parameter of each next-hop relay node, to obtain a third parameter of each next-hop relay node includes: performing average processing on the first parameter and the second parameter of each next-hop relay node, to obtain the third parameter of each next-hop relay node; or performing summation processing on the first parameter and the second parameter of each next-hop relay node, to obtain the third parameter of each next-hop relay node; or performing weighting processing on the first parameter and the second parameter of each next-hop relay node, to obtain the third parameter of each next-hop relay node.

This embodiment of this disclosure is described by using an example in which a target relay node is selected only according to a speed condition or a load condition. In another embodiment, the target relay node may be alternatively selected according to another condition. A condition for selecting the target relay node is not limited in this embodiment of this disclosure.

The third relay node 2028 obtains a target relay node of the third relay node 2028 in the same manner in which the first relay node 2024 obtains a target relay node, and each selected target relay node obtains a next-hop target relay node in the same manner in which the first relay node obtains a target relay node, until an obtained next-hop target relay node is the second relay node.

After determining the target relay node, the first relay node 2024 may transmit the connection request message to the target relay node, and correspondingly stores the token identifier and identification information of the target relay node.

The third relay node 2028 transmits the identification information of the second relay node 2026 and the identification information of the third relay node 2028 to the control node 2021, and the control node 2021 selects a target relay node from a plurality of next-hop relay nodes of the third relay node 2028. Optionally, after transmitting the connection request message to the target relay node, the third relay node 2028 correspondingly stores the token identifier and identification information of the target relay node. Each selected target relay node obtains a next-hop target relay node from the control node 2021, and correspondingly stores the token identifier and identification information of the next-hop target relay node after transmitting the connection request message to the next-hop target relay node.

In addition, if the second terminal 203 agrees to establish a communication connection, the second terminal 203 further needs to transmit a connection confirmation message to the first terminal 201. The connection confirmation message further needs to be returned according to a transmission path of the connection request message. Therefore, each target relay node further correspondingly stores the token identifier and a node identifier of a previous-hop relay node.

In addition, after receiving the connection request message, the target relay node can further create a process, and use the process to perform steps of obtaining a next-hop target relay node, forwarding the connection request message, and the like in response to the connection request message. Optionally, a process identifier of the process is the same as a process identifier of a corresponding process in the previous-hop relay node, or is designated by the previous-hop relay node. To be specific, after receiving the connection request message, the first relay node 2024 creates a process, a process identifier of the process being A. The first relay node 2024 may transmit the process identifier and the connection request message to the third relay node 2028, and the third relay node 2028 creates a process, and uses the process identifier A as a process identifier of the process. Subsequently, when forwarding communication data of the first terminal 201, the first relay node 2024 can directly trigger the process of the third relay node 2028 according to the process identifier.

Optionally, after transmitting the connection request message to the third relay node 2028, the first relay node further transmits the relay process list of the first relay node 2024 to the control node 2021, so that the control node 2021 updates the relay process list corresponding to the first relay node 2024. After transmitting the connection request message to the next-hop target relay node, each target relay node further transmits a relay process list of the target relay node to the control node 2021, so that the control node 2021 updates the relay process list corresponding to the target relay node.

In a first possible implementation, after the information about the relay path between the first relay node 2024 and the second relay node 2026 is transmitted to the first relay node 2024, a path request transmitted by the third relay node 2028 is received, the path request being transmitted by the third relay node 2028 upon reception of the connection request message, the path request carrying identification information of the third relay node 2028 and the second user identifier, and the third relay node 2028 being different from the first relay node 2024. The second relay node 2026 corresponding to the second user identifier is determined according to the correspondence. Information about a transit path between the third relay node 2028 and the second relay node 2026 is transmitted to the third relay node 2028, so that the third relay node 2028 transmits the connection request message to the second relay node 2026 according to the information about the relay path.

In a second possible implementation, after receiving a path request of the first relay node 2024, the control node 2021 obtains information about a relay path between the first relay node 2024 and the second relay node 2026. The first relay node 2024 transmits the connection request message and the information about the relay path to a next-hop relay node in the relay path according to the indication of the information about the relay path. Each relay node in the relay path transmits the connection request message and the information about the relay path to a next-hop relay node according to the indication of the information about the relay path.

Optionally, a manner in which the control node 2021 determines the information about the relay path between the first relay node 2024 and the second relay node 2026 based on the identification information includes: determining the information about the relay path between the first relay node 2024 and the second relay node 2026 based on address information of the first relay node 2024 and address information of the second relay node 2026, the information about the relay path including identification information of at least one relay node.

The control node 2021 stores a topological structure of a plurality of relay nodes, and determines the information about the relay path between the first relay node 2024 and the second relay node 2026 according to a node identifier of the first relay node 2024, a node identifier of the second relay node 2026, and the topological structure of the plurality of relay nodes.

Optionally, when determining the information about the relay path between the first relay node 2024 and the second relay node 2026, the control node 2021 determines a relay node in the relay path in the manner of selecting a target relay node described in the first possible implementation. Details are not described again in this embodiment of this disclosure.

This embodiment of this disclosure is described only by using an example in which step 604 is performed, where the control node 2021 determines the information about the relay path. In some embodiments, step 604 is not performed. After determining the second relay node 2026 corresponding to the second user identifier according to the correspondence between a user identifier and a relay node, the control node 2021 transmits the node identifier of the second relay node 2026 to the first relay node 2024. The first relay node 2024 selects a target relay node from a plurality of next-hop relay nodes of the first relay node 2024, and transmits the connection request message to the target relay node, so that the target relay node transmits the connection request message to the second relay node 2026 through a relay path to the second relay node 2026.

The selecting a target relay node from a plurality of next-hop relay nodes of the first relay node 2024 includes at least one of the following operations: (1) selecting a target relay node meeting a speed condition from the plurality of next-hop relay nodes of the first relay node 2024, the speed condition being that a data transmission speed between the first relay node 2024 and the target relay node is greater than a data transmission speed between the first relay node 2024 and another next-hop relay node; and (2) selecting a target relay node meeting a load condition from the plurality of next-hop relay nodes of the first relay node 2024, the load condition being that a load amount of the target relay node is less than a load amount of another next-hop relay node.

605. The first relay node 2024 transmits the connection request message to the second relay node 2026 according to the information about the relay path.

In a first possible implementation, the information about the relay path indicates only a next-hop relay node, and each relay node other than the second relay node 2026 in the relay path needs to obtain information about a relay path from the control node 2021, to transmit the connection request message to a next-hop target relay node.

Optionally, after receiving the identification information of the target relay node, the first relay node 2024 correspondingly stores the token identifier and the identification information of the target relay node.

In a second possible implementation, the information about the relay path indicates the relay path between the first relay node 2024 and the second relay node 2026, and each relay node in the relay path transmits the connection request message and the information about the relay path to a next-hop target relay node according to the indication of the information about the relay path.

606. The second relay node 2026 transmits the connection request message to the second terminal 203.

Because the second terminal 203 logs in to the second relay node 2026, the second relay node 2026 stores the address information of the second terminal 203, and transmits the connection request message to the second terminal 203 based on the address information of the second terminal 203. Alternatively, the control node 2021 stores a correspondence between a user identifier and address information of a terminal. The address information of the second terminal 203 is obtained from the control node 2021 based on the second user identifier, and the connection request message is transmitted to the second terminal 203 according to the address information.

In a possible implementation, the connection request message carries the address information of the second terminal 203, and the second relay node 2026 transmits the connection request message to the second terminal 203 according to the address information of the second terminal 203.

607. After receiving the connection request message, the second terminal 203 transmits a connection confirmation message to the second relay node 2026.

After receiving the connection request message, the second terminal 203 directly generates the connection confirmation message according to the connection request message. Alternatively, after receiving a confirmation instruction for the connection request message, the second terminal 203 transmits the connection confirmation message to the second relay node 2026.

In a possible implementation, a current interface of the second terminal 203 displays the connection request message, and the connection request message indicates that the first terminal 201 is to establish a communication connection with the second terminal 203. If a confirmation instruction for the connection request message is received, the second terminal 203 generates the connection confirmation message, and transmits the connection confirmation message to the second relay node 2026.

The connection confirmation message carries the second user identifier of the second terminal 203. Optionally, the connection confirmation message further carries the token identifier, so that each relay node in a relay path obtains identification information of a next-hop target relay node according to the token identifier.

In a possible implementation, the connection confirmation message further carries the address information of the first terminal 201, so that the first relay node 2024 directly transmits the connection confirmation message to the first terminal 201.

608. After receiving the connection confirmation message, the second relay node 2026 transmits the connection confirmation message to the first relay node 2024.

After receiving the connection confirmation message, the second relay node 2026 obtains, based on the token identifier in the connection confirmation message, identification information of a next-hop target relay node from a correspondence between a token identifier and identification information of a target relay node, and transmits the connection confirmation message to the next-hop target relay node, thereby transmitting the connection confirmation message to the first relay node 2024 through the original path.

For example, the second relay node 2026 obtains identification information of a previous-hop relay node according to the token identifier, uses the previous-hop relay node as a next-hop target relay node, and transmits the connection confirmation message to the next-hop target relay node.

609. After receiving the connection confirmation message, the first relay node 2024 transmits the connection confirmation message to the first terminal 201, and the first terminal 201 establishes a communication connection with the second terminal 203 based on the connection confirmation message.

After the first terminal 201 establishes the communication connection with the second terminal 203, the first terminal 201 can communicate with the second terminal 203 through the established communication connection. In a possible implementation, the first relay node 2024 receives a communication request message transmitted by the first terminal 201, the communication request message carrying the token identifier and communication data; obtains the identification information of the target relay node that is stored corresponding to the token identifier, and using the identification information of the target relay node as identification information of a third relay node 2028; and transmits the communication request message to the third relay node 2028, so that the third relay node 2028 transmits the communication request message to the second relay node 2026 through a relay path to the second relay node 2026, and the second relay node 2026 transmits the communication request message to the second terminal 203.

After the first terminal 201 and the second terminal 203 establish the communication connection, the first user identifier, the identification information of the first relay node 2024, and the address information of the first terminal 201 are deleted in a case that an interruption duration of a connection relationship between the first terminal 201 and the first relay node 2024 exceeds a target duration. The second user identifier, the identification information of the second relay node 2026, and the address information of the second terminal 203 are deleted in a case that an interruption duration of a connection relationship between the second terminal 203 and the second relay node 2026 exceeds the target duration.

Optionally, a relay node can further delete a correspondence between a token identifier and a target relay node according to the token identifier. Optionally, a relay node can further delete a corresponding process.

When the first terminal 201 and the second terminal 203 establish the communication connection, if a relay node is abnormal in the relay path between the first relay node 2024 and the second relay node 2026, the second terminal 203 is off-line, or another case occurs, a connection failure message is returned to the first terminal 201.

In a possible implementation, any one of the plurality of relay nodes and the control node 2021 is a node in a blockchain system. If the first relay node 2024 is the node in the blockchain system, after establishing the communication connection, the first relay node 2024 generates a communication connection record, and stores the communication connection record in the blockchain system, the communication connection record including the first user identifier and the second user identifier. Alternatively, after the first terminal 201 logs in to the first relay node 2024, a correspondence between the first user identifier and the first relay node 2024 is stored in the blockchain system. Alternatively, after the connection request message is received, the connection request message is stored in the blockchain system. Alternatively, after transmitting the connection request message to the target relay node, the first relay node 2024 correspondingly stores the token identifier and the identification information of the target relay node into the blockchain system. Alternatively, after receiving the communication request message, the first relay node 2024 generates a communication request record, and stores the communication request record in the blockchain system.

In the method provided in this embodiment of this disclosure, both the first terminal 201 and the second terminal 203 log in to relay nodes, and a communication connection between the first terminal 201 and the second terminal 203 is established by using at least one relay node. Because the first terminal 201 and the second terminal 203 log in to the relay nodes, changes of address information of the first terminal 201 and the second terminal 203 do not affect communication between the first terminal 201 as well as the second terminal 203 and the relay nodes to which the first terminal 201 and the second terminal 203 log in, and address information of the relay nodes do not change, the communication connection is not affected. When a location of the first terminal 201 or the second terminal 203 changes, the first terminal 201 and the second terminal 203 can still communicate with each other by using the established communication connection. There is no need to re-establish a connection, so that the communication efficiency is improved.

In addition, when the communication connection between the first terminal 201 and the second terminal 203 is established, at least one relay node needs to be selected to perform data forwarding. During selection of the relay node, a data transmission speed, load, and the like of the relay node are considered, to ensure real-time interaction between the first terminal 201 and the second terminal 203.

In a possible implementation, a relay node includes RelaySvr (a data relay module) and RelayNode (a node management module).

RelaySvr: A terminal can log in to RelaySvr on the relay node, RelaySvr is responsible for communication between terminals, and data packets transmitted by the terminal need to be relayed through one or more layers of RelaySvr.

RelayNode: It is configured to obtain identification information of a plurality of next-hop relay nodes communicatively connected to the relay node; and can be further configured to measure a data transmission speed between the relay node and each next-hop relay node; provide address information of a next-hop relay node during data relay; and report a relay process list of the relay node and the data transmission speed between the relay node and each next-hop relay node to the control node.

The control node 2021 may include: RelayOnline (a user online service 802), RelayCenter (an internal relay control and monitoring center 804), RelayCluster (an external client-specific control center 806), and P2PStun (a P2P network address translation (NAT) session transmission application).

RelayOnline (the user online service 802): It stores address information of a current online user and address information of RelaySvr to which the current online user logs in, and provides a corresponding service for relay routing and P2P hole punching.

RelayCenter (the internal relay control and monitoring center 804): It stores relay process lists, identification information, and speed detection results of a plurality of current relay nodes; recognizes and identifies an abnormal node; calculates a next-hop relay node according to a speed detection result and routing configuration between nodes, and delivers a relay process list of a next-hop relay node of each relay node and a current optimal dynamic routing table to RelayNode of each relay node; and is responsible for quality monitoring of a backend server and a node link, and discovering and processing exceptions.

RelayCluster (the external client-specific control center 806): It stores related information, such as addresses and loads of relay processes, of the plurality of current relay nodes, configuration information of terminals, and the like; filters relay nodes according to a configuration rule and an external IP address of a user source; and is responsible for delivering configuration information of terminals and relay node lists; and balancing the loads of the processes and controlling a capacity.

P2PStun (the P2P NAT session transmission application): It provides a service for hole punching of P2P NAT, which is mainly providing a public IP address and a NAT type of a client.

Figure 8:
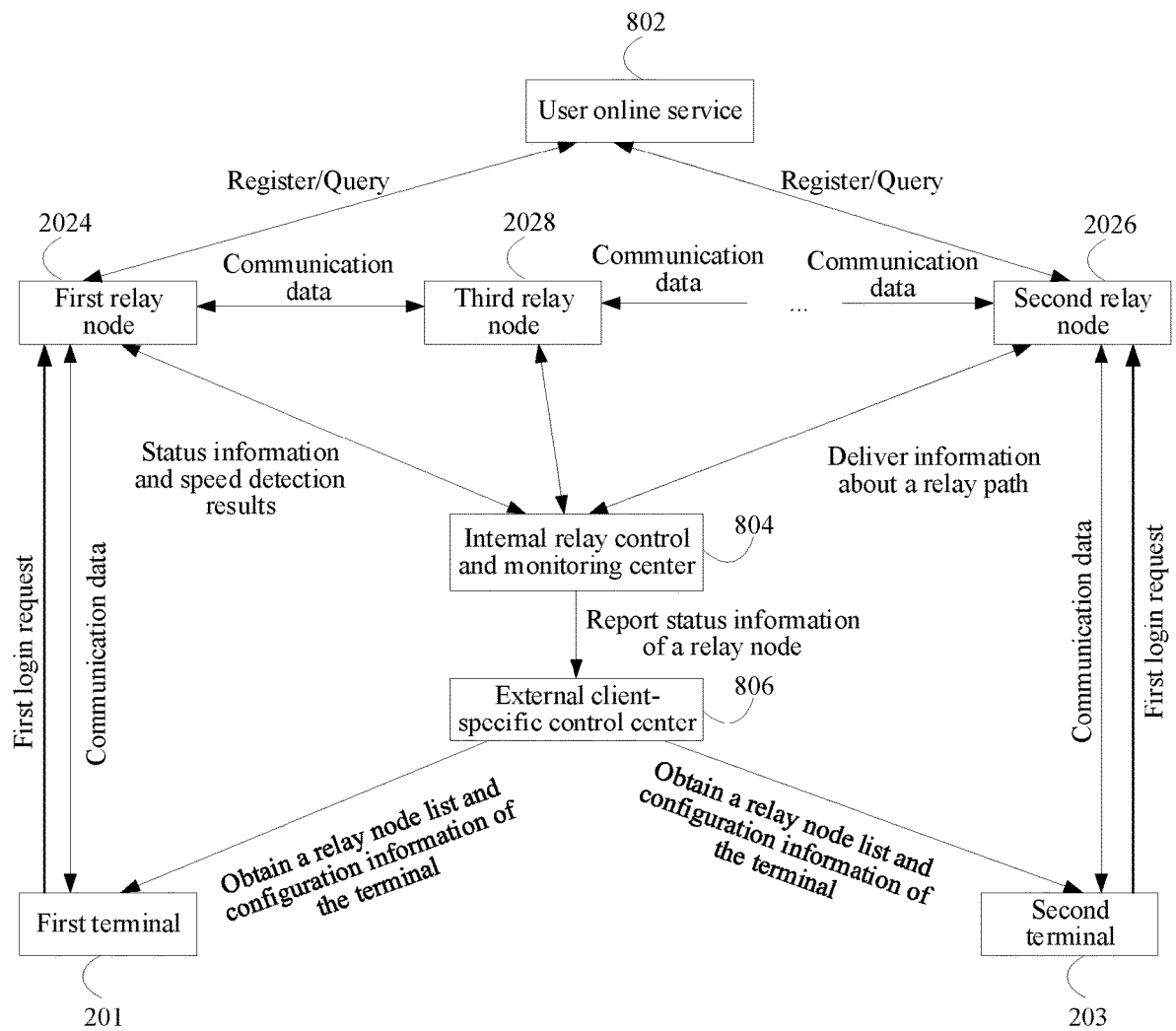
FIG. 8 is a flowchart of a method for establishing a communication connection according to an embodiment of this disclosure.

As shown in FIG. 8, a target application is installed on a first terminal 201 and a second terminal 203. The target application may be a session transmission application. By using the target application, the first terminal 201 transmits a second login request to RelayCluster, and obtains a relay node list and configuration information of the terminal in RelayCluster. The first terminal 201 selects a relay node from the relay node list as a first relay node 2024, and transmits a first login request to the first relay node 2024. The first relay node 2024 controls the first terminal 201 to perform login, and transmits a registration request to RelayOnline. RelayOnline correspondingly stores a first user identifier of the first terminal 201, identification information of the first relay node 2024, and address information of the first terminal 201.

When the first terminal 201 and the second terminal 203 establish a communication connection, the first terminal 201 transmits a connection request message to the first relay node 2024. After receiving the connection request message, the first relay node 2024 transmits a first path request to RelayOnline based on a second user identifier of the second terminal 203, and find identification information of the second relay node 2026 and address information of the second terminal 203 in RelayOnline. After obtaining the identification information of the second relay node 2026, the first relay node 2024 transmits a second path request to RelayCenter. RelayCenter transmits identification information of a plurality of next-hop relay nodes that are directly communicatively connected to the first relay node 2024 and are close to the second relay node 2026 to the first relay node 2024. The first relay node 2024 performs speed detection according to the plurality of next-hop relay nodes, to obtain a speed detection result of each next-hop relay node, and transmits the speed detection result to RelayCenter. RelayCenter determines a third relay node 2028 corresponding to the first relay node 2024, and delivers information about a relay path to the first relay node 2024, the information about the relay path including identification information of the third relay node 2028. The first relay node 2024 transmits the connection request message to the third relay node 2028. The third relay node 2028 obtains information about a relay path from RelayCenter. A manner in which the third relay node 2028 obtains the information about the relay path is similar to the manner in which the first relay node 2024 obtains the information about the relay path. Details are not described herein again. The foregoing operation is completed until the connection request message is transmitted to the second relay node 2026.

The second relay node 2026 transmits the connection request message to the second terminal 203, receives a connection confirmation message returned by the second terminal 203, and transmits the connection confirmation message to the first terminal 201 according to a transmission path of the connection request message.

After the communication connection between the first terminal 201 and the second terminal 203 is established, the first terminal 201 transmits communication data to the second terminal 203. A process of transmitting the communication data may be as follows: The first terminal 201 transmits the communication data to the first relay node 2024, the first relay node 2024 transmits the communication data to the third relay node 2028 according to the information about the relay path until a previous-hop relay node of the second relay node 2026 transmits the communication data to the second relay node 2026, and the second relay node 2026 transmits the communication data to the second terminal 203.

In addition, RelayCenter transmits status information of a plurality of relay nodes to RelayOnline, so that RelayOnline generates a corresponding relay node list.

Figure 9:
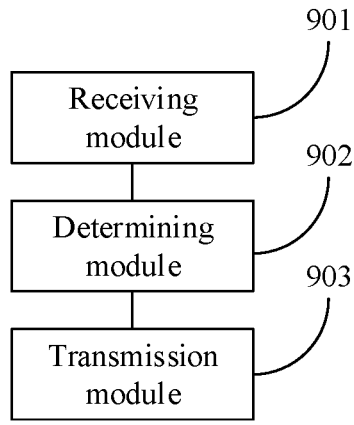
FIG. 9 is a schematic structural diagram of an apparatus for establishing a communication connection according to an embodiment of this disclosure.

FIG. 9 is a schematic structural diagram of an apparatus for establishing a communication connection according to an embodiment of this disclosure. Referring to FIG. 9, the apparatus includes: a receiving module 901, a determining module 902, and a transmission module 903.

The receiving module 901 is configured to receive a connection request message transmitted by a first terminal, the connection request message carrying a first user identifier logging in to the first terminal and a second user identifier logging in to a second terminal. The determining module 902 is configured to determine a second relay node corresponding to the second user identifier according to a correspondence between a user identifier and a relay node, the second relay node being a relay node communicatively connected to the second terminal. The transmission module 903 is configured to transmit the connection request message to the second relay node through a relay path to the second relay node, so that the second relay node transmits the connection request message to the second terminal. The transmission module 903 is further configured to transmit, upon reception of a connection confirmation message returned by the second terminal, the connection confirmation message to the first terminal, so that the first terminal establishes a communication connection with the second terminal based on the connection confirmation message.

Figure 10:
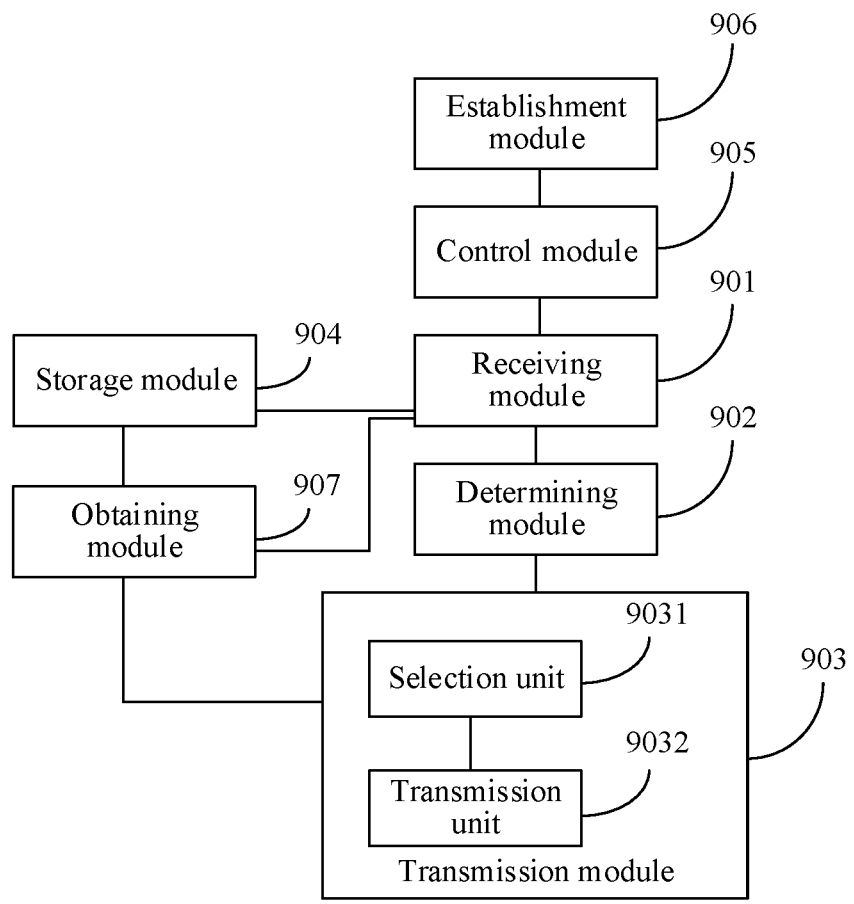
FIG. 10 is a schematic structural diagram of another apparatus for establishing a communication connection according to an embodiment of this disclosure.

In a possible implementation, as shown in FIG. 10, the transmission module 903 includes: a selection unit 9031, configured to select a target relay node from a plurality of next-hop relay nodes of the first relay node; and a transmission unit 9032, configured to transmit the connection request message to the target relay node, so that the target relay node transmits the connection request message to the second relay node through a relay path to the second relay node.

In a possible implementation, the selection unit 9031 is configured to perform at least one of the following operations: selecting a target relay node meeting a speed condition from the plurality of next-hop relay nodes of the first relay node, the speed condition being that a data transmission speed between the first relay node and the target relay node is greater than a data transmission speed between the first relay node and another next-hop relay node; and selecting a target relay node meeting a load condition from the plurality of next-hop relay nodes of the first relay node, the load condition being that a load amount of the target relay node is less than a load amount of another next-hop relay node.

In a possible implementation, as shown in FIG. 10, the first relay node is a node in a blockchain system, and the apparatus further includes: a storage module 904, configured to generate a communication connection record after the first terminal and the second terminal establish the communication connection, and store the communication connection record in the blockchain system, the communication connection record including the first user identifier and the second user identifier.

In a possible implementation, the receiving module 901 is configured to receive a first login request transmitted by the first terminal, the first login request carrying the first user identifier; and as shown in FIG. 10, the apparatus further includes: a control module 905, configured to control the first terminal to perform login based on the first user identifier; and an establishment module 906, configured to establish a correspondence between the first user identifier and the first relay node.

In a possible implementation, the connection request message carries a token identifier; and the storage module 904 is configured to correspondingly store the token identifier and identification information of the target relay node.

In a possible implementation, the receiving module 901 is configured to receive a communication request message transmitted by the first terminal, the communication request message carrying the token identifier and communication data; as shown in FIG. 10, the apparatus further includes: an obtaining module 907, configured to obtain the identification information of the target relay node that is stored corresponding to the token identifier; and the transmission module 903 is configured to transmit the communication request message to the target relay node based on the identification information, so that the target relay node transmits the communication request message to the second relay node through the relay path to the second relay node, and the second relay node transmits the communication request message to the second terminal.

Figure 11:
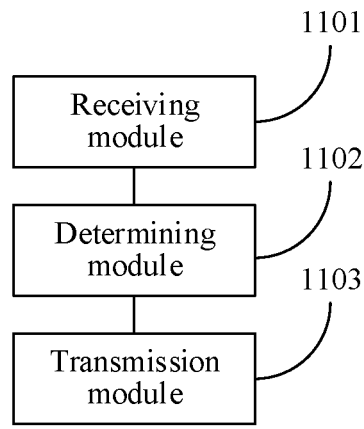
FIG. 11 is a schematic structural diagram of an apparatus for establishing a communication connection according to an embodiment of this disclosure.

FIG. 11 is a schematic structural diagram of an apparatus for establishing a communication connection according to an embodiment of this disclosure. Referring to FIG. 11, the apparatus includes: a receiving module 1101, a determining module 1102, and a transmission module 1103.

The receiving module 1101 is configured to receive a path request transmitted by a first relay node, the path request being transmitted by the first relay node upon reception of a connection request message transmitted by a first terminal, the connection request message carrying a first user identifier logging in to the first terminal and a second user identifier logging in to a second terminal, and the path request carrying identification information of the first relay node and the second user identifier. The determining module 1102 is configured to determine a second relay node corresponding to the second user identifier according to a correspondence between a user identifier and a relay node, the second relay node being a relay node communicatively connected to the second terminal. The transmission module 1103 is configured to transmit, based on the identification information, information about a relay path between the first relay node and the second relay node to the first relay node, so that the first relay node transmits the connection request message to the second relay node according to the information about the relay path, and the second relay node transmits the connection request message to the second terminal.

Figure 12:
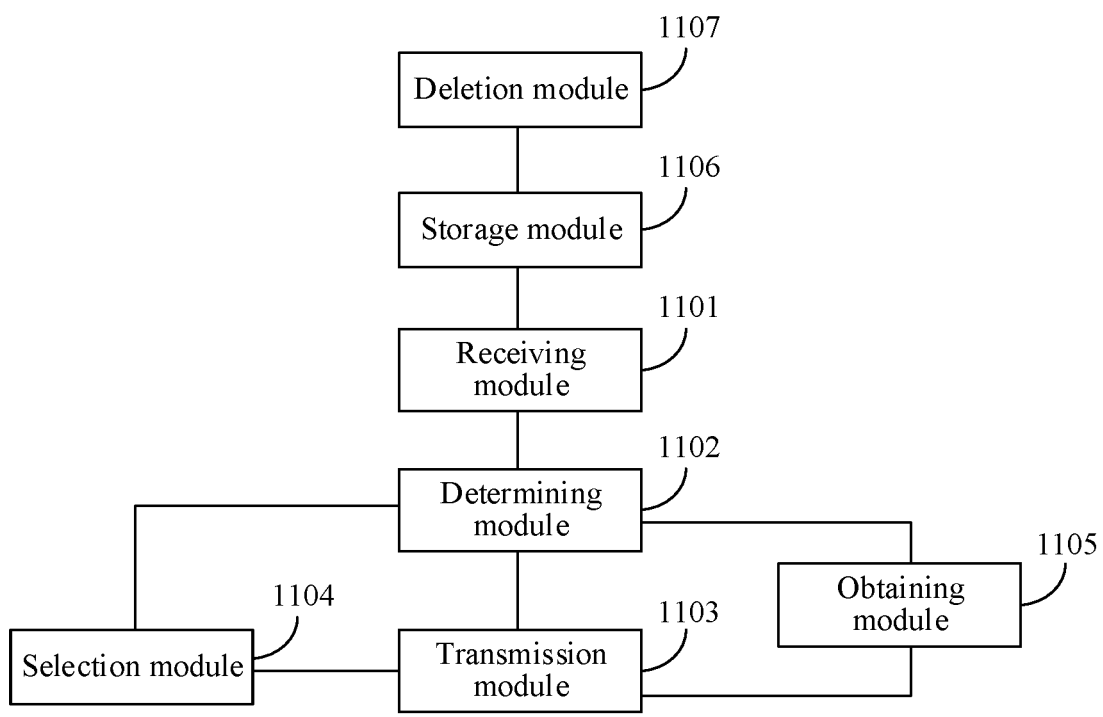
FIG. 12 is a schematic structural diagram of another apparatus for establishing a communication connection according to an embodiment of this disclosure.

In a possible implementation, as shown in FIG. 12, the apparatus further includes: a selection module 1104, configured to select a target relay node from a plurality of next-hop relay nodes of the first relay node; and use identification information of the target relay node as information about the relay path.

In a possible implementation, the selection module 1104 is configured to perform at least one of the following operations: selecting a target relay node meeting a speed condition from the plurality of next-hop relay nodes of the first relay node, the speed condition being that a data transmission speed between the first relay node and the target relay node is greater than a data transmission speed between the first relay node and another next-hop relay node; and selecting a target relay node meeting a load condition from the plurality of next-hop relay nodes of the first relay node, the load condition being that a load amount of the target relay node is less than a load amount of another next-hop relay node.

In a possible implementation, the receiving module 1101 is further configured to receive a path request transmitted by a third relay node, the path request being transmitted by the third relay node upon reception of the connection request message, the path request carrying identification information of the third relay node and the second user identifier, and the third relay node being different from the first relay node. The determining module 1102 is further configured to determine the second relay node corresponding to the second user identifier according to the correspondence. The selection module 1104 is further configured to select a target relay node from a plurality of next-hop relay nodes of the third relay node; and use identification information of the target relay node as information about the relay path. The transmission module 1103 is further configured to transmit, based on the identification information of the third relay node, the information about the relay path to the third relay node, so that the third relay node transmits the connection request message to the target relay node according to the information about the relay path, the target relay node transmits the connection request message to the second relay node, and the second relay node transmits the connection request message to the second terminal.

In a possible implementation, the receiving module 1101 is further configured to receive a second login request transmitted by the first terminal, the second login request carrying a network identifier of the first terminal; as shown in FIG. 12, the apparatus further includes: an obtaining module 1105, configured to obtain a relay node list corresponding to the network identifier, the relay node list including identification information of at least one relay node, and the at least one relay node being communicatively connected to a network corresponding to the network identifier; and the transmission module 1103 is configured to transmit the relay node list to the first terminal, so that the first terminal selects the identification information of the first relay node from the relay node list, and transmits a first login request to the first relay node based on the identification information, the first login request carrying the first user identifier.

In a possible implementation, the receiving module 1101 is configured to receive a registration request transmitted by the first relay node, the registration request carrying the first user identifier, the identification information of the first relay node, and address information of the first terminal; and as shown in FIG. 12, the apparatus further includes: a storage module 1106, configured to correspondingly store the first user identifier, the identification information of the first relay node, and the address information of the first terminal.

In a possible implementation, as shown in FIG. 12, the apparatus further includes: a deletion module 1107, configured to delete the first user identifier, the identification information of the first relay node, and the address information of the first terminal in a case that an interruption duration of a connection relationship between the first terminal and the first relay node exceeds a target duration.

In a possible implementation, the control node is a node in a blockchain system, and the storage module 1106 is configured to store the first user identifier, the identification information of the first relay node, and the address information of the first terminal in the blockchain system.

Figure 13:
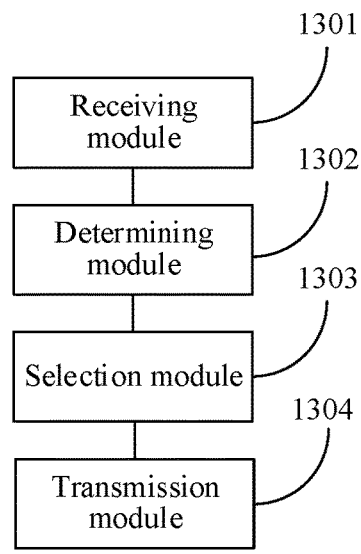
FIG. 13 is a schematic structural diagram of an apparatus for establishing a communication connection according to an embodiment of this disclosure.

FIG. 13 is a schematic structural diagram of an apparatus for establishing a communication connection according to an embodiment of this disclosure. Referring to FIG. 13, the apparatus includes: a receiving module 1301, a determining module 1302, a selection module 1303, and a transmission module 1304.

The receiving module 1301 is configured to receive a connection request message transmitted by a previous-hop relay node, the connection request message being transmitted by a first terminal to a first relay node and then being forwarded by the first relay node, and the connection request message carrying a first user identifier logging in to the first terminal and a second user identifier logging in to a second terminal. The determining module 1302 is configured to determine a second relay node corresponding to the second user identifier according to a correspondence between a user identifier and a relay node, the second relay node being a relay node communicatively connected to the second terminal. The selection module 1303 is configured to select a target relay node from a plurality of next-hop relay nodes of the third relay node. The transmission module 1304 is configured to transmit the communication request message to the target relay node, so that the target relay node transmits the communication request message to the second relay node through a relay path to the second relay node, and the second relay node transmits the communication request message to the second terminal. The transmission module 1304 is further configured to transmit, upon reception of a connection confirmation message returned by the second terminal, the connection confirmation message to the previous-hop relay node, so that the previous-hop relay node transmits the connection confirmation message to the first terminal, and the first terminal establishes a communication connection with the second terminal based on the connection confirmation message.

Figure 14:
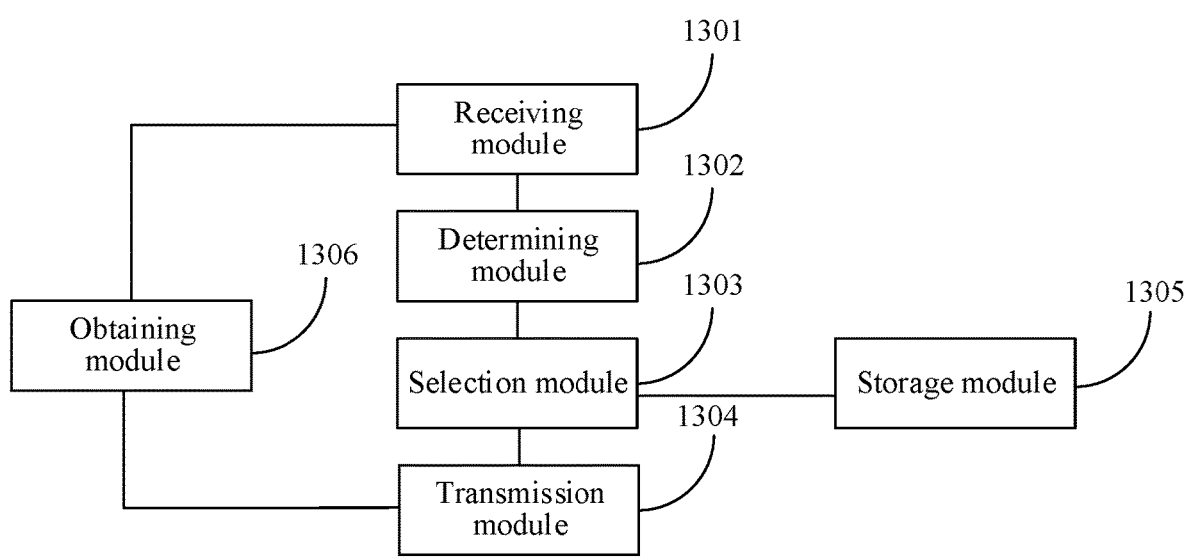
FIG. 14 is a schematic structural diagram of another apparatus for establishing a communication connection according to an embodiment of this disclosure.

In a possible implementation, as shown in FIG. 14, the connection request message carries a token identifier, and the apparatus further includes: a storage module 1305, configured to correspondingly store the token identifier and identification information of the target relay node.

In a possible implementation, the receiving module 1301 is configured to receive a communication request message transmitted by the previous-hop relay node, the communication request message being transmitted by the previous-hop relay node upon reception of a communication request message transmitted by the first terminal, and the communication request message carrying the token identifier and communication data; as shown in FIG. 14, the apparatus further includes: an obtaining module 1306, configured to obtain the identification information of the target relay node that is stored corresponding to the token identifier; and the transmission module 1304 is configured to transmit the communication request message to the target relay node based on the identification information, so that the target relay node transmits the communication request message to the second relay node through the relay path to the second relay node, and the second relay node transmits the communication request message to the second terminal.

Figure 15:
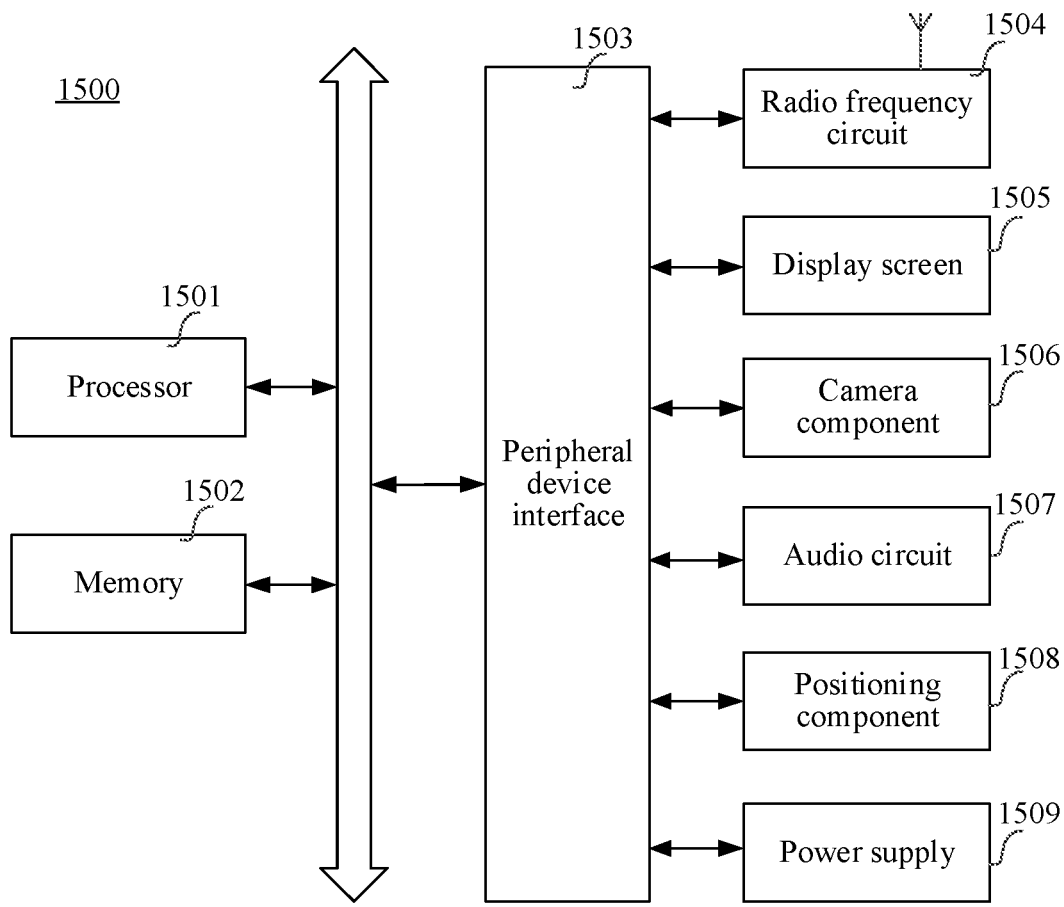
FIG. 15 is a structural block diagram of a terminal according to an embodiment of this disclosure.

FIG. 15 is a structural block diagram of a terminal according to an embodiment of this disclosure. The terminal 1500 is configured to perform steps performed by the first terminal or the second terminal in the foregoing embodiment. Optionally, the terminal 1500 is a portable mobile terminal, such as a smartphone, a tablet computer, a moving picture experts group audio layer III (MP3) player, a moving picture experts group audio layer IV (MP4) player, a notebook computer, or a desktop computer. The terminal 1500 may also be referred to as a user equipment, a portable terminal, a laptop terminal, a desktop terminal, or another name.

Generally, the terminal 1500 includes: a processor 1501 and a memory 1502.

Optionally, the processor 1501 includes one or more processing cores, for example, a 4-core processor or an 8-core processor. Optionally, the processor 1501 may be implemented in at least one hardware form of a digital signal processor (DSP), a field-programmable gate array (FPGA), and a programmable logic array (PLA). Optionally, the processor 1501 includes a main processor and a coprocessor. The main processor is configured to process data in an active state, also referred to as a central processing unit (CPU). The coprocessor is a low-power processor configured to process data in a standby state. In some embodiments, a graphics processing unit (GPU) may be integrated into the processor 1501. The GPU is configured to be responsible for rendering and drawing content to be displayed on a display screen. In some embodiments, the processor 1501 may further include an artificial intelligence (AI) processor. The AI processor is configured to process a computing operation related to machine learning.

The memory 1502 includes one or more computer-readable storage media. Optionally, the computer-readable storage medium is non-transient. Optionally, the memory 1502 further includes a high-speed random access memory and a non-volatile memory, such as one or more magnetic disk storage devices or flash storage devices. In some embodiments, the non-transitory computer-readable storage medium in the memory 1502 is configured to store at least one instruction, the at least one instruction being configured to be executed by the processor 1501 to implement the method for establishing a communication connection provided in the method embodiments of this disclosure.

In some embodiments, the terminal 1500 further includes: a peripheral device interface 1503 and at least one peripheral device. The processor 1501, the memory 1502, and the peripheral interface 1503 may be communicatively connected through a bus or a signal cable. Each peripheral is communicatively connected to the peripheral interface 1503 through a bus, a signal cable, or a circuit board. For example, the peripheral device includes at least one of a radio frequency (RF) circuit 1504, a display screen 1505, a camera component 1506, an audio circuit 1507, a positioning component 1508, and a power supply 1509.

The peripheral interface 1503 may be configured to connect at least one peripheral device related to input/output (I/O) to the processor 1501 and the memory 1502. In some embodiments, the processor 1501, the memory 1502, and the peripheral interface 1503 are integrated into the same chip or circuit board. In some other embodiments, any one or two of the processor 1501, the memory 1502, and the peripheral interface 1503 may be implemented on an independent chip or circuit board. This is not limited in this embodiment of this disclosure.

The RF circuit 1504 is configured to receive and transmit an RF signal, which is also referred to as an electromagnetic signal. The RF circuit 1504 communicates with a communication network and another communication device by using the electromagnetic signal. The RF circuit 1504 converts an electric signal into an electromagnetic signal for transmission, or converts a received electromagnetic signal into an electric signal. Optionally, the RF circuit 1504 includes: an antenna system, an RF transceiver, one or more amplifiers, a tuner, an oscillator, a DSP, a codec chip set, and a subscriber identity module card. The RF circuit 1504 may communicate with another terminal through at least one wireless communication protocol. The wireless communication protocol includes, but is not limited to, a world wide web, a metropolitan area network, an intranet, generations of mobile communication networks (2G, 3G, 4G, and 5G), a wireless local area network, and/or a wireless fidelity (Wi-Fi) network. In some embodiments, the RF circuit 1504 further includes a circuit related to near field communication (NFC). This is not limited in this disclosure.

The display screen 1505 is configured to display a user interface (UI). The UI may include a graphic, a text, an icon, a video, and any combination thereof. When the display screen 1505 is a touch screen, the display screen 1505 is further capable of collecting a touch signal on or above a surface of the display screen 1505. The touch signal may be inputted to the processor 1501 for processing as a control signal. In this case, the display screen 1505 is further configured to provide a virtual button and/or a virtual keyboard, which is also referred to as a soft button and/or a soft keyboard. In some embodiments, there is one display screen 1505, disposed on a front panel of the terminal 1500. In some other embodiments, there are at least two display screens 1505, disposed on different surfaces of the terminal 1500 respectively or in a folded design. In some embodiments, the display screen 1505 is a flexible display screen, disposed on a curved surface or a folded surface of the terminal 1500. Even, the display screen 1505 is set in a non-rectangular irregular pattern, namely, a special-shaped screen. Optionally, the display screen 1505 is manufactured by using a material such as a liquid crystal display (LCD) or an organic light-emitting diode (OLED).

The camera component 1506 is configured to acquire an image or a video. Optionally, the camera component 1506 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each being any one of a main camera, a depth of field camera, a wide-angle camera, and a telephoto camera, to implement a background blurring function through fusion of the main camera and the depth of field camera, panoramic photo shooting and virtual reality (VR) shooting functions through fusion of the main camera and wide-angle camera, or another fusion shooting function. In some embodiments, the camera component 1506 further includes a flash. Optionally, the flash is a single color temperature flash or a double color temperature flash. The double color temperature flash is a combination of a warm light flash and a cold light flash, and may be used for light compensation under different color temperatures.

Optionally, the audio circuit 1507 may include a microphone and a speaker. The microphone is configured to collect sound waves of a user and an environment, and convert the sound waves into electrical signals and input the electrical signals into the processor 1501 for processing, or input the electrical signals into the RF circuit 1504 to implement voice communication. For the purpose of stereo collection or noise reduction, there may be a plurality of microphones, disposed at different portions of the terminal 1500 respectively. The microphone may be further an array microphone or an omni-directional collection type microphone. The speaker is configured to convert electrical signals from the processor 1501 or the RF circuit 1504 into sound waves. Optionally, the speaker is a conventional thin-film speaker or a piezoelectric ceramic speaker. When the speaker is the piezoelectric ceramic speaker, electrical signals not only can be converted into sound waves that can be heard by human, but also can be converted into sound waves that cannot be heard by human for ranging or other uses. In some embodiments, the audio circuit 1507 further includes an earphone jack.

The positioning component 1508 is configured to determine a current geographic location of the terminal 1500, to implement navigation or a location based service (LBS). Optionally, the positioning component 1508 is a positioning component based on the Global Positioning System (GPS) of the United States, the BeiDou system of China, the GLONASS System of Russia, or the GALILEO System of the European Union.

The power supply 1509 is configured to supply power to components in the terminal 1500. Optionally, the power supply 1509 is an alternating current, a direct current, a disposable battery, or a rechargeable battery. When the power supply 1509 includes a rechargeable battery, the rechargeable battery is a wired rechargeable battery or a wireless rechargeable battery. The rechargeable battery may further be configured to support a quick charge technology.

A person skilled in the art may understand that the structure shown in FIG. 15 does not constitute a limitation to the terminal 1500, and the terminal may include more or fewer components than those shown in the figure, or some components may be combined, or a different component arrangement may be used.

Figure 16:
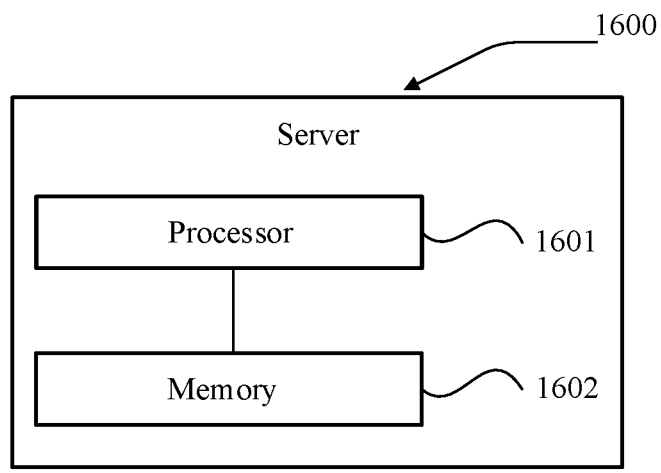
FIG. 16 is a schematic structural diagram of a server according to an embodiment of this disclosure.

FIG. 16 is a schematic structural diagram of a server according to an embodiment of this disclosure. The server 1600 may vary greatly due to different configurations or performance, and may include one or more processors (such as CPUs) 1601 and one or more memories 1602. The memory 1602 stores at least one instruction, the at least one instruction being loaded and executed by the processor 1601 to implement the methods provided in the foregoing method embodiments. Certainly, the server may further include components such as a wired or wireless network interface, a keyboard, and an I/O interface, to facilitate inputs/outputs. The server may further include another component configured to implement functions of a device, and details are not described herein.

The server 1600 may be further configured to perform steps performed by the relay node or the control node in the foregoing method for establishing a communication connection.

An embodiment of this disclosure further provides a computer device. The computer device includes a processor and a memory, the memory storing at least one instruction, the instruction being loaded and executed by the processor to implement the following operations: receiving a connection request message transmitted by a first terminal, the connection request message carrying a first user identifier logging in to the first terminal and a second user identifier logging in to a second terminal; determining a second relay node corresponding to the second user identifier according to a correspondence between a user identifier and a relay node, the second relay node being a relay node communicatively connected to the second terminal; transmitting the connection request message to the second relay node through a relay path to the second relay node, so that the second relay node transmits the connection request message to the second terminal; and transmitting, upon reception of a connection confirmation message returned by the second terminal, the connection confirmation message to the first terminal, so that the first terminal establishes a communication connection with the second terminal based on the connection confirmation message.

Optionally, the instruction is loaded and executed by the processor to implement the following operations: selecting a target relay node from a plurality of next-hop relay nodes of the first relay node; and transmitting the connection request message to the target relay node, so that the target relay node transmits the connection request message to the second relay node through a relay path to the second relay node.

Optionally, the instruction is loaded and executed by the processor to implement at least one of the following operations: selecting a target relay node meeting a speed condition from the plurality of next-hop relay nodes of the first relay node, the speed condition being that a data transmission speed between the first relay node and the target relay node is greater than a data transmission speed between the first relay node and another next-hop relay node; and selecting a target relay node meeting a load condition from the plurality of next-hop relay nodes of the first relay node, the load condition being that a load amount of the target relay node is less than a load amount of another next-hop relay node.

Optionally, the first relay node is a node in a blockchain system, and the instruction is loaded and executed by the processor to implement the following operations: generating a communication connection record after the first terminal and the second terminal establish the communication connection, and storing the communication connection record in the blockchain system, the communication connection record including the first user identifier and the second user identifier.

Optionally, the instruction is loaded and executed by the processor to implement the following operations: receiving a first login request transmitted by the first terminal, the first login request carrying the first user identifier; controlling the first terminal to perform login based on the first user identifier; and establishing a correspondence between the first user identifier and the first relay node.

Optionally, the connection request message carries a token identifier, and the instruction is loaded and executed by the processor to implement the following operation: correspondingly storing the token identifier and identification information of the target relay node.

Optionally, the instruction is loaded and executed by the processor to implement the following operations: receiving a communication request message transmitted by the first terminal, the communication request message carrying the token identifier and communication data; obtaining the identification information of the target relay node that is stored corresponding to the token identifier; and transmitting the communication request message to the target relay node based on the identification information, so that the target relay node transmits the communication request message to the second relay node through the relay path to the second relay node, and the second relay node transmits the communication request message to the second terminal.

An embodiment of this disclosure further provides a computer device. The computer device includes a processor and a memory, the memory storing at least one instruction, the instruction being loaded and executed by the processor to implement the following operations: receiving a path request transmitted by a first relay node, the path request being transmitted by the first relay node upon reception of a connection request message transmitted by a first terminal, the connection request message carrying a first user identifier logging in to the first terminal and a second user identifier logging in to a second terminal, and the path request carrying identification information of the first relay node and the second user identifier; determining a second relay node corresponding to the second user identifier according to a correspondence between a user identifier and a relay node, the second relay node being a relay node communicatively connected to the second terminal; transmitting, based on the identification information, information about a relay path between the first relay node and the second relay node to the first relay node, so that the first relay node transmits the connection request message to the second relay node according to the information about the relay path, and the second relay node transmits the connection request message to the second terminal.

Optionally, the instruction is loaded and executed by the processor to implement the following operations: selecting a target relay node from a plurality of next-hop relay nodes of the first relay node; and using identification information of the target relay node as the information about the relay path.

Optionally, the instruction is loaded and executed by the processor to implement at least one of the following operations: selecting a target relay node meeting a speed condition from the plurality of next-hop relay nodes of the first relay node, the speed condition being that a data transmission speed between the first relay node and the target relay node is greater than a data transmission speed between the first relay node and another next-hop relay node; and selecting a target relay node meeting a load condition from the plurality of next-hop relay nodes of the first relay node, the load condition being that a load amount of the target relay node is less than a load amount of another next-hop relay node.

Optionally, the instruction is loaded and executed by the processor to implement the following operations: receiving a path request transmitted by a third relay node, the path request being transmitted by the third relay node upon reception of the connection request message, the path request carrying identification information of the third relay node and the second user identifier, and the third relay node being different from the first relay node; determining the second relay node corresponding to the second user identifier according to the correspondence; selecting a target relay node from a plurality of next-hop relay nodes of the third relay node; using identification information of the target relay node as information about the relay path; and transmitting, based on the identification information of the third relay node, the information about the relay path to the third relay node, so that the third relay node transmits the connection request message to the target relay node according to the information about the relay path, the target relay node transmits the connection request message to the second relay node, and the second relay node transmits the connection request message to the second terminal.

Optionally, the instruction is loaded and executed by the processor to implement the following operations: receiving a second login request transmitted by the first terminal, the second login request carrying a network identifier of the first terminal; obtaining a relay node list corresponding to the network identifier, the relay node list including identification information of at least one relay node, and the at least one relay node being communicatively connected to a network corresponding to the network identifier; and transmitting the relay node list to the first terminal, so that the first terminal selects the identification information of the first relay node from the relay node list, and transmits a first login request to the first relay node based on the identification information, the first login request carrying the first user identifier.

Optionally, the instruction is loaded and executed by the processor to implement the following operations: receiving a registration request transmitted by the first relay node, the registration request carrying the first user identifier, the identification information of the first relay node, and address information of the first terminal; and correspondingly storing the first user identifier, the identification information of the first relay node, and the address information of the first terminal.

Optionally, the instruction is loaded and executed by the processor to implement the following operations: deleting the first user identifier, the identification information of the first relay node, and the address information of the first terminal in a case that an interruption duration of a connection relationship between the first terminal and the first relay node exceeds a target duration.

Optionally, the control node is a node in a blockchain system, and the instruction is loaded and executed by the processor to implement the following operation: storing the first user identifier, the identification information of the first relay node, and the address information of the first terminal in the blockchain system.

An embodiment of this disclosure further provides a computer device. The computer device includes a processor and a memory, the memory storing at least one instruction, the instruction being loaded and executed by the processor to implement the following operations: receiving a connection request message transmitted by a previous-hop relay node, the connection request message being transmitted by a first terminal to a first relay node and then being forwarded by the first relay node, and the connection request message carrying a first user identifier logging in to the first terminal and a second user identifier logging in to a second terminal; determining a second relay node corresponding to the second user identifier according to a correspondence between a user identifier and a relay node, the second relay node being a relay node communicatively connected to the second terminal; selecting a target relay node from a plurality of next-hop relay nodes of the third relay node; transmitting the connection request message to the target relay node, so that the target relay node transmits the connection request message to the second relay node through a relay path to the second relay node, and the second relay node transmits the connection request message to the second terminal; and transmitting, upon reception of a connection confirmation message returned by the second terminal, the connection confirmation message to the previous-hop relay node, so that the previous-hop relay node transmits the connection confirmation message to the first terminal, and the first terminal establishes a communication connection with the second terminal based on the connection confirmation message.

Optionally, the connection request message carries a token identifier, and the instruction is loaded and executed by the processor to implement the following operation: correspondingly storing the token identifier and identification information of the target relay node.

Optionally, the instruction is loaded and executed by the processor to implement the following operations: receiving a communication request message transmitted by the previous-hop relay node, the communication request message being transmitted by the previous-hop relay node upon reception of a communication request message transmitted by the first terminal, and the communication request message carrying the token identifier and communication data; obtaining the identification information of the target relay node that is stored corresponding to the token identifier; and transmitting the communication request message to the target relay node based on the identification information, so that the target relay node transmits the communication request message to the second relay node through the relay path to the second relay node, and the second relay node transmits the communication request message to the second terminal.

An embodiment of this disclosure further provides a computer-readable storage medium. The computer-readable storage medium stores at least one instruction, the instruction being loaded and executed by a processor to implement the following operations: receiving a connection request message transmitted by a first terminal, the connection request message carrying a first user identifier logging in to the first terminal and a second user identifier logging in to a second terminal; determining a second relay node corresponding to the second user identifier according to a correspondence between a user identifier and a relay node, the second relay node being a relay node communicatively connected to the second terminal; transmitting the connection request message to the second relay node through a relay path to the second relay node, so that the second relay node transmits the connection request message to the second terminal; and transmitting, upon reception of a connection confirmation message returned by the second terminal, the connection confirmation message to the first terminal, so that the first terminal establishes a communication connection with the second terminal based on the connection confirmation message.

Optionally, the instruction is loaded and executed by the processor to implement the following operations: selecting a target relay node from a plurality of next-hop relay nodes of the first relay node; and transmitting the connection request message to the target relay node, so that the target relay node transmits the connection request message to the second relay node through a relay path to the second relay node.

Optionally, the instruction is loaded and executed by the processor to implement at least one of the following operations: selecting a target relay node meeting a speed condition from the plurality of next-hop relay nodes of the first relay node, the speed condition being that a data transmission speed between the first relay node and the target relay node is greater than a data transmission speed between the first relay node and another next-hop relay node; and selecting a target relay node meeting a load condition from the plurality of next-hop relay nodes of the first relay node, the load condition being that a load amount of the target relay node is less than a load amount of another next-hop relay node.

Optionally, the first relay node is a node in a blockchain system, and the instruction is loaded and executed by the processor to implement the following operations: generating a communication connection record after the first terminal and the second terminal establish the communication connection, and storing the communication connection record in the blockchain system, the communication connection record including the first user identifier and the second user identifier.

Optionally, the instruction is loaded and executed by the processor to implement the following operations: receiving a first login request transmitted by the first terminal, the first login request carrying the first user identifier; controlling the first terminal to perform login based on the first user identifier; and establishing a correspondence between the first user identifier and the first relay node.

Optionally, the connection request message carries a token identifier, and the instruction is loaded and executed by the processor to implement the following operation: correspondingly storing the token identifier and identification information of the target relay node.

Optionally, the instruction is loaded and executed by the processor to implement the following operations: receiving a communication request message transmitted by the first terminal, the communication request message carrying the token identifier and communication data; obtaining the identification information of the target relay node that is stored corresponding to the token identifier; and transmitting the communication request message to the target relay node based on the identification information, so that the target relay node transmits the communication request message to the second relay node through the relay path to the second relay node, and the second relay node transmits the communication request message to the second terminal.

An embodiment of this disclosure further provides a computer-readable storage medium. The computer-readable storage medium stores at least one instruction, the instruction being loaded and executed by a processor to implement the following operations: receiving a path request transmitted by a first relay node, the path request being transmitted by the first relay node upon reception of a connection request message transmitted by a first terminal, the connection request message carrying a first user identifier logging in to the first terminal and a second user identifier logging in to a second terminal, and the path request carrying identification information of the first relay node and the second user identifier; determining a second relay node corresponding to the second user identifier according to a correspondence between a user identifier and a relay node, the second relay node being a relay node communicatively connected to the second terminal; transmitting, based on the identification information, information about a relay path between the first relay node and the second relay node to the first relay node, so that the first relay node transmits the connection request message to the second relay node according to the information about the relay path, and the second relay node transmits the connection request message to the second terminal.

Optionally, the instruction is loaded and executed by the processor to implement the following operations: selecting a target relay node from a plurality of next-hop relay nodes of the first relay node; and using identification information of the target relay node as the information about the relay path.

Optionally, the instruction is loaded and executed by the processor to implement at least one of the following operations: selecting a target relay node meeting a speed condition from the plurality of next-hop relay nodes of the first relay node, the speed condition being that a data transmission speed between the first relay node and the target relay node is greater than a data transmission speed between the first relay node and another next-hop relay node; and selecting a target relay node meeting a load condition from the plurality of next-hop relay nodes of the first relay node, the load condition being that a load amount of the target relay node is less than a load amount of another next-hop relay node.

Optionally, the instruction is loaded and executed by the processor to implement the following operations: receiving a path request transmitted by a third relay node, the path request being transmitted by the third relay node upon reception of the connection request message, the path request carrying identification information of the third relay node and the second user identifier, and the third relay node being different from the first relay node; determining the second relay node corresponding to the second user identifier according to the correspondence; selecting a target relay node from a plurality of next-hop relay nodes of the third relay node; use identification information of the target relay node as information about the relay path; and transmitting, based on the identification information of the third relay node, the information about the relay path to the third relay node, so that the third relay node transmits the connection request message to the target relay node according to the information about the relay path, the target relay node transmits the connection request message to the second relay node, and the second relay node transmits the connection request message to the second terminal.

Optionally, the instruction is loaded and executed by the processor to implement the following operations: receiving a second login request transmitted by the first terminal, the second login request carrying a network identifier of the first terminal; obtaining a relay node list corresponding to the network identifier, the relay node list including identification information of at least one relay node, and the at least one relay node being communicatively connected to a network corresponding to the network identifier; and transmitting the relay node list to the first terminal, so that the first terminal selects the identification information of the first relay node from the relay node list, and transmits a first login request to the first relay node based on the identification information, the first login request carrying the first user identifier.

Optionally, the instruction is loaded and executed by the processor to implement the following operations: receiving a registration request transmitted by the first relay node, the registration request carrying the first user identifier, the identification information of the first relay node, and address information of the first terminal; and correspondingly storing the first user identifier, the identification information of the first relay node, and the address information of the first terminal.

Optionally, the instruction is loaded and executed by the processor to implement the following operations: deleting the first user identifier, the identification information of the first relay node, and the address information of the first terminal in a case that an interruption duration of a connection relationship between the first terminal and the first relay node exceeds a target duration.

Optionally, the control node is a node in a blockchain system, and the instruction is loaded and executed by the processor to implement the following operation: storing the first user identifier, the identification information of the first relay node, and the address information of the first terminal in the blockchain system.

An embodiment of this disclosure further provides a computer-readable storage medium. The computer-readable storage medium stores at least one instruction, the instruction being loaded and executed by a processor to implement the following operations: receiving a connection request message transmitted by a previous-hop relay node, the connection request message being transmitted by a first terminal to a first relay node and then being forwarded by the first relay node, and the connection request message carrying a first user identifier logging in to the first terminal and a second user identifier logging in to a second terminal; determining a second relay node corresponding to the second user identifier according to a correspondence between a user identifier and a relay node, the second relay node being a relay node communicatively connected to the second terminal; selecting a target relay node from a plurality of next-hop relay nodes of the third relay node; transmitting the connection request message to the target relay node, so that the target relay node transmits the connection request message to the second relay node through a relay path to the second relay node, and the second relay node transmits the connection request message to the second terminal; and transmitting, upon reception of a connection confirmation message returned by the second terminal, the connection confirmation message to the previous-hop relay node, so that the previous-hop relay node transmits the connection confirmation message to the first terminal, and the first terminal establishes a communication connection with the second terminal based on the connection confirmation message.

Optionally, the connection request message carries a token identifier, and the instruction is loaded and executed by the processor to implement the following operation: correspondingly storing the token identifier and identification information of the target relay node.

Optionally, the instruction is loaded and executed by the processor to implement the following operations: receiving a communication request message transmitted by the previous-hop relay node, the communication request message being transmitted by the previous-hop relay node upon reception of a communication request message transmitted by the first terminal, and the communication request message carrying the token identifier and communication data; obtaining the identification information of the target relay node that is stored corresponding to the token identifier; and transmitting the communication request message to the target relay node based on the identification information, so that the target relay node transmits the communication request message to the second relay node through the relay path to the second relay node, and the second relay node transmits the communication request message to the second terminal.

An embodiment of this disclosure further provides a computer program product or a computer program. The computer program product or the computer program stores computer program code, the computer program code being stored in a computer-readable storage medium. A processor of a computer device reads the computer program code from the computer-readable storage medium, and the processor executes the computer program code, to cause the computer device to implement the following operations: receiving a connection request message transmitted by a first terminal, the connection request message carrying a first user identifier logging in to the first terminal and a second user identifier logging in to a second terminal; determining a second relay node corresponding to the second user identifier according to a correspondence between a user identifier and a relay node, the second relay node being a relay node communicatively connected to the second terminal; transmitting the connection request message to the second relay node through a relay path to the second relay node, so that the second relay node transmits the connection request message to the second terminal; and transmitting, upon reception of a connection confirmation message returned by the second terminal, the connection confirmation message to the first terminal, so that the first terminal establishes a communication connection with the second terminal based on the connection confirmation message.

Optionally, the processor executes the computer program code, to cause the computer device to implement the following operations: selecting a target relay node from a plurality of next-hop relay nodes of the first relay node; and transmitting the connection request message to the target relay node, so that the target relay node transmits the connection request message to the second relay node through a relay path to the second relay node.

Optionally, the processor executes the computer program code, to cause the computer device to implement at least one of the following operations: selecting a target relay node meeting a speed condition from the plurality of next-hop relay nodes of the first relay node, the speed condition being that a data transmission speed between the first relay node and the target relay node is greater than a data transmission speed between the first relay node and another next-hop relay node; and selecting a target relay node meeting a load condition from the plurality of next-hop relay nodes of the first relay node, the load condition being that a load amount of the target relay node is less than a load amount of another next-hop relay node.

Optionally, the first relay node is a node in a blockchain system, and the processor executes the computer program code, to cause the computer device to implement the following operations: generating a communication connection record after the first terminal and the second terminal establish the communication connection, and storing the communication connection record in the blockchain system, the communication connection record including the first user identifier and the second user identifier.

Optionally, the processor executes the computer program code, to cause the computer device to implement the following operations: receiving a first login request transmitted by the first terminal, the first login request carrying the first user identifier; controlling the first terminal to perform login based on the first user identifier; and establishing a correspondence between the first user identifier and the first relay node.

Optionally, the connection request message carries a token identifier, and the processor executes the computer program code, to cause the computer device to implement the following operation: correspondingly storing the token identifier and identification information of the target relay node.

Optionally, the processor executes the computer program code, to cause the computer device to implement the following operations: receiving a communication request message transmitted by the first terminal, the communication request message carrying the token identifier and communication data; obtaining the identification information of the target relay node that is stored corresponding to the token identifier; and transmitting the communication request message to the target relay node based on the identification information, so that the target relay node transmits the communication request message to the second relay node through the relay path to the second relay node, and the second relay node transmits the communication request message to the second terminal.

An embodiment of this disclosure further provides a computer program product or a computer program. The computer program product or the computer program stores computer program code, the computer program code being stored in a computer-readable storage medium. A processor of a computer device reads the computer program code from the computer-readable storage medium, and the processor executes the computer program code, to cause the computer device to implement the following operations: receiving a path request transmitted by a first relay node, the path request being transmitted by the first relay node upon reception of a connection request message transmitted by a first terminal, the connection request message carrying a first user identifier logging in to the first terminal and a second user identifier logging in to a second terminal, and the path request carrying identification information of the first relay node and the second user identifier; determining a second relay node corresponding to the second user identifier according to a correspondence between a user identifier and a relay node, the second relay node being a relay node communicatively connected to the second terminal; transmitting, based on the identification information, information about a relay path between the first relay node and the second relay node to the first relay node, so that the first relay node transmits the connection request message to the second relay node according to the information about the relay path, and the second relay node transmits the connection request message to the second terminal.

Optionally, the processor executes the computer program code, to cause the computer device to implement the following operations: selecting a target relay node from a plurality of next-hop relay nodes of the first relay node; and using identification information of the target relay node as the information about the relay path.

Optionally, the processor executes the computer program code, to cause the computer device to implement at least one of the following operations: selecting a target relay node meeting a speed condition from the plurality of next-hop relay nodes of the first relay node, the speed condition being that a data transmission speed between the first relay node and the target relay node is greater than a data transmission speed between the first relay node and another next-hop relay node; and selecting a target relay node meeting a load condition from the plurality of next-hop relay nodes of the first relay node, the load condition being that a load amount of the target relay node is less than a load amount of another next-hop relay node.

Optionally, the processor executes the computer program code, to cause the computer device to implement the following operations: receiving a path request transmitted by a third relay node, the path request being transmitted by the third relay node upon reception of the connection request message, the path request carrying identification information of the third relay node and the second user identifier, and the third relay node being different from the first relay node; determining the second relay node corresponding to the second user identifier according to the correspondence; selecting a target relay node from a plurality of next-hop relay nodes of the third relay node; use identification information of the target relay node as information about the relay path; and transmitting, based on the identification information of the third relay node, the information about the relay path to the third relay node, so that the third relay node transmits the connection request message to the target relay node according to the information about the relay path, the target relay node transmits the connection request message to the second relay node, and the second relay node transmits the connection request message to the second terminal.

Optionally, the processor executes the computer program code, to cause the computer device to implement the following operations: receiving a second login request transmitted by the first terminal, the second login request carrying a network identifier of the first terminal; obtaining a relay node list corresponding to the network identifier, the relay node list including identification information of at least one relay node, and the at least one relay node being communicatively connected to a network corresponding to the network identifier; and transmitting the relay node list to the first terminal, so that the first terminal selects the identification information of the first relay node from the relay node list, and transmits a first login request to the first relay node based on the identification information, the first login request carrying the first user identifier.

Optionally, the processor executes the computer program code, to cause the computer device to implement the following operations: receiving a registration request transmitted by the first relay node, the registration request carrying the first user identifier, the identification information of the first relay node, and address information of the first terminal; and correspondingly storing the first user identifier, the identification information of the first relay node, and the address information of the first terminal.

Optionally, the processor executes the computer program code, to cause the computer device to implement the following operations: deleting the first user identifier, the identification information of the first relay node, and the address information of the first terminal in a case that an interruption duration of a connection relationship between the first terminal and the first relay node exceeds a target duration.

Optionally, the control node is a node in a blockchain system, and the processor executes the computer program code, to cause the computer device to implement the following operation: storing the first user identifier, the identification information of the first relay node, and the address information of the first terminal in the blockchain system.

An embodiment of this disclosure further provides a computer program product or a computer program. The computer program product or the computer program stores computer program code, the computer program code being stored in a computer-readable storage medium. A processor of a computer device reads the computer program code from the computer-readable storage medium, and the processor executes the computer program code, to cause the computer device to implement the following operations: receiving a connection request message transmitted by a previous-hop relay node, the connection request message being transmitted by a first terminal to a first relay node and then being forwarded by the first relay node, and the connection request message carrying a first user identifier logging in to the first terminal and a second user identifier logging in to a second terminal; determining a second relay node corresponding to the second user identifier according to a correspondence between a user identifier and a relay node, the second relay node being a relay node communicatively connected to the second terminal; selecting a target relay node from a plurality of next-hop relay nodes of the third relay node; transmitting the connection request message to the target relay node, so that the target relay node transmits the connection request message to the second relay node through a relay path to the second relay node, and the second relay node transmits the connection request message to the second terminal; and transmitting, upon reception of a connection confirmation message returned by the second terminal, the connection confirmation message to the previous-hop relay node, so that the previous-hop relay node transmits the connection confirmation message to the first terminal, and the first terminal establishes a communication connection with the second terminal based on the connection confirmation message.

Optionally, the connection request message carries a token identifier, and the processor executes the computer program code, to cause the computer device to implement the following operation: correspondingly storing the token identifier and identification information of the target relay node.

Optionally, the processor executes the computer program code, to cause the computer device to implement the following operations: receiving a communication request message transmitted by the previous-hop relay node, the communication request message being transmitted by the previous-hop relay node upon reception of a communication request message transmitted by the first terminal, and the communication request message carrying the token identifier and communication data; obtaining the identification information of the target relay node that is stored corresponding to the token identifier; and transmitting the communication request message to the target relay node based on the identification information, so that the target relay node transmits the communication request message to the second relay node through the relay path to the second relay node, and the second relay node transmits the communication request message to the second terminal.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely optional embodiments of this disclosure, but are not intended to limit this disclosure. Any modification, equivalent replacement, or improvement made within the spirit and principle of this disclosure shall fall within the protection scope of this disclosure.

What is claimed is:

1. A method for establishing a communication connection in a relay communication system, the relay communication system comprising a control node and a plurality of relay nodes, comprising:
   receiving, with a first relay node, a connection request message transmitted by a first terminal, the connection request message carrying a first user identifier for logging into the first terminal and a second user identifier for logging into a second terminal, the first user identifier being for indicating an identity of a user of the first terminal and the second user identifier being for indicating an identity of a user of the second terminal;
   determining, with the first relay node, a second relay node corresponding to the second user identifier, the second relay node being a relay node in communication with the second terminal;
   identifying, with the first relay node, a first next-hop relay node with a highest data transmission speed from a plurality of next-hop relay nodes of the first relay node;
   identifying, with the first relay node, a second next-hop relay node with a lowest load from the plurality of next-hop relay nodes of the first relay node;
   selecting, with the first relay node, one of the first next-hop relay node and the second next-hop relay node as a target relay node in a relay path for transmitting the connection request message;
   selecting, with the first relay node, another one of the first next-hop relay node and the second next-hop relay node as a standby relay node for the relay path;
   transmitting, with the first relay node, the connection request message to the second relay node through the relay path to the second relay node, so that the second relay node transmits the connection request message to the second terminal;
   in response to receiving a connection confirmation message returned by the second terminal, transmitting, with the first relay node, the connection confirmation message to the first terminal, so that the first terminal establishes a communication connection with the second terminal based on the connection confirmation message, the communication connection is established via the relay path between the first relay node and the second relay node; and
   establishing, with the first relay node, a correspondence between the first user identifier and the first relay node, so that the first terminal keeps using the communication connection to communicate with the second terminal regardless of change of address information of the first terminal.

2. The method of claim 1, wherein transmitting the connection request message to the second relay node through the relay path to the second relay node comprises:
transmitting the connection request message to the target relay node, so that the target relay node transmits the connection request message to the second relay node through a relay path to the second relay node.

3. The method of claim 1, wherein the first relay node is a node in a blockchain system, and the method further comprises:
generating a communication connection record after the first terminal and the second terminal establish the communication connection; and
storing the communication connection record in the blockchain system, the communication connection record comprising the first user identifier and the second user identifier.

4. The method of claim 1, wherein before receiving the connection request message transmitted by a first terminal, the method further comprises:
receiving a first login request transmitted by the first terminal, the first login request carrying the first user identifier;
controlling the first terminal to perform login based on the first user identifier; and
establishing a correspondence between the first user identifier and the first relay node.

5. The method of claim 2, wherein the connection request message carries a token identifier, and after selecting the target relay node from the plurality of next-hop relay nodes of the first relay node, the method further comprises:
storing the token identifier and identification information of the target relay node.

6. The method of claim 5, wherein after the transmitting the connection confirmation message to the first terminal, the method further comprises:
receiving a communication request message transmitted by the first terminal, the communication request message carrying the token identifier and communication data;
obtaining the identification information of the target relay node corresponding to the token identifier; and
transmitting the communication request message to the target relay node based on the identification information, so that the target relay node transmits the communication request message to the second relay node through the relay path to the second relay node and the second relay node transmits the communication request message to the second terminal.

7. A method for establishing a communication connection in a relay communication system, the relay communication system comprising a control node and a plurality of relay nodes, comprising:
receiving, with the control node, a path request transmitted by a first relay node, the path request being transmitted by the first relay node in response to receiving a connection request message transmitted by a first terminal, the connection request message carrying a first user identifier for logging into the first terminal and a second user identifier for logging into a second terminal, the first user identifier being for indicating an identity of a user of the first terminal and the second user identifier being for indicating an identity of a user of the second terminal, and the path request carrying identification information of the first relay node and the second user identifier;
determining, with the control node, a second relay node corresponding to the second user identifier, the second relay node being a relay node communicatively connected to the second terminal; and
identifying, with the control node, a first next-hop relay node with a highest data transmission speed from a plurality of next-hop relay nodes of the first relay node;
identifying, with the control node, a second next-hop relay node with a lowest load from the plurality of next-hop relay nodes of the first relay node;
selecting, with the control node, one of the first next-hop relay node and the second next-hop relay node as a target relay node in a relay path for transmitting the connection request message;
selecting, with the control node, another one of the first next-hop relay node and the second next-hop relay node as a standby relay node for the relay path;
transmitting, with the control node, information about the relay path between the first relay node and the second relay node to the first relay node based on the identification information, so that the first relay node transmits the connection request message to the second relay node according to the information about the relay path, and the second relay node transmits the connection request message to the second terminal, and the first relay node transmits a connection confirmation message returned by the second terminal to the first terminal, so that the first terminal establishes a communication connection with the second terminal based on the connection confirmation message, the communication connection is established via the relay path between the first relay node and the second relay node, where a correspondence between the first user identifier and the first relay node is established by the first relay node, so that the first terminal keeps using the communication connection to communicate with the second terminal regardless of change of address information of the first terminal.

8. The method of claim 7, wherein before transmitting the information about the relay path between the first relay node and the second relay node to the first relay node, the method further comprises:
using identification information of the target relay node as the information about the relay path.

9. The method of claim 8, wherein after transmitting the information about the relay path between the first relay node and the second relay node to the first relay node, the method further comprises:
receiving a path request transmitted by a third relay node, the path request being transmitted by the third relay node in response to receiving the connection request message, the path request carrying identification information of the third relay node and the second user identifier, and the third relay node being different from the first relay node;
determining the second relay node corresponding to the second user identifier;
selecting a second target relay node from a plurality of next-hop relay nodes of the third relay node;
using identification information of the second target relay node as information about the relay path; and
transmitting, based on the identification information of the third relay node, the information about the relay path to the third relay node, so that the third relay node transmits the connection request message to the second target relay node according to the information about the relay path, the second target relay node transmits the connection request message to the second relay node, and the second relay node transmits the connection request message to the second terminal.

10. The method of claim 7, wherein before receiving the path request transmitted by the first relay node, the method further comprises:
receiving a second login request transmitted by the first terminal, the second login request carrying a network identifier of the first terminal;
obtaining a relay node list corresponding to the network identifier, the relay node list comprising identification information of at least one relay node, and the at least one relay node being communicatively connected to a network corresponding to the network identifier; and
transmitting the relay node list to the first terminal, so that the first terminal selects the identification information of the first relay node from the relay node list, and transmits a first login request to the first relay node based on the identification information, the first login request carrying the first user identifier.

11. The method of claim 10, wherein after transmitting the relay node list to the first terminal, the method further comprises:
receiving a registration request transmitted by the first relay node, the registration request carrying the first user identifier, the identification information of the first relay node, and address information of the first terminal; and
storing the first user identifier, the identification information of the first relay node, and the address information of the first terminal.

12. The method of claim 11, wherein after storing the first user identifier, the identification information of the first relay node, and the address information of the first terminal, the method further comprises:
deleting the first user identifier, the identification information of the first relay node, and the address information of the first terminal in response to an interruption duration of a connection between the first terminal and the first relay node exceeding a target duration.

13. The method of claim 11, wherein the control node is a node in a blockchain system, and the method further comprises:
storing the first user identifier, the identification information of the first relay node, and the address information of the first terminal in the blockchain system.

14. A method for establishing a communication connection in a relay communication system, the relay communication system comprising a control node and a plurality of relay nodes, comprising:
receiving, with a third relay node, a connection request message transmitted by a previous-hop relay node, the connection request message being transmitted by a first terminal to the previous-hop relay node via a first relay node in communication with the first terminal, and the connection request message carrying a first user identifier for logging into the first terminal and a second user identifier for logging into a second terminal, the first user identifier being for indicating an identity of a user of the first terminal and the second user identifier being for indicating an identity of a user of the second terminal;
determining, with the third relay node, a second relay node corresponding to the second user identifier, the second relay node being a relay node communicatively connected to the second terminal;
identifying, with the third relay node, a first next-hop relay node with a highest data transmission speed from a plurality of next-hop relay nodes of the third relay node;
identifying, with the third relay node, a second next-hop relay node with a lowest load from the plurality of next-hop relay nodes of the third relay node;
selecting, with the third relay node, one of the first next-hop relay node and the second next-hop relay node as a target relay node;
selecting, with the third relay node, another one of the first next-hop relay node and the second next-hop relay node as a standby relay node serving as a backup node of the target relay node;
transmitting, with the third relay node, the connection request message to the target relay node, so that the target relay node transmits the connection request message to the second relay node through a relay path to the second relay node, and the second relay node transmits the connection request message to the second terminal; and
in response to receiving a connection confirmation message returned by the second terminal, transmitting, with the third relay node, the connection confirmation message to the previous-hop relay node, so that the previous-hop relay node transmits the connection confirmation message to the first terminal, and the first terminal establishes a communication connection with the second terminal based on the connection confirmation message, the communication connection is established via the relay path between the first relay node and the second relay node, where a correspondence between the first user identifier and the first relay node is established by the first relay node, so that the first terminal keeps using the communication connection to communicate with the second terminal regardless of change of address information of the first terminal.

15. The method of claim 14, wherein the connection request message carries a token identifier, and after selecting the target relay node from the plurality of next-hop relay nodes of the third relay node, the method further comprises:
storing the token identifier and identification information of the target relay node.

16. The method of claim 15, wherein after transmitting the connection confirmation message to the previous-hop relay node, the method further comprises:
receiving a communication request message transmitted by the previous-hop relay node, the communication request message being transmitted by the previous-hop relay node in response to receiving the communication request message transmitted by the first terminal, and the communication request message carrying the token identifier and communication data;
obtaining the identification information of the target relay node corresponding to the token identifier; and
transmitting the communication request message to the target relay node based on the identification information, so that the target relay node transmits the communication request message to the second relay node through the relay path to the second relay node, and the second relay node transmits the communication request message to the second terminal.

* * * * *